(12) United States Patent
Ishizuka et al.

(10) Patent No.: US 8,010,277 B2
(45) Date of Patent: Aug. 30, 2011

(54) FUEL INJECTION CONTROLLER AND DIAGNOSIS METHOD OF FUEL SUPPLY SYSTEM

(75) Inventors: Kouji Ishizuka, Chita-gun (JP); Yuuki Tarusawa, Kariya (JP); Minoru Imai, Kariya (JP)

(73) Assignee: Denso Corporation, Kariya (JP)

( * ) Notice: Subject to any disclaimer, the term of this patent is extended or adjusted under 35 U.S.C. 154(b) by 620 days.

(21) Appl. No.: 11/926,996

(22) Filed: Oct. 29, 2007

(65) Prior Publication Data

US 2008/0103675 A1    May 1, 2008

(30) Foreign Application Priority Data

Oct. 30, 2006  (JP) ................................. 2006-294776

(51) Int. Cl.
*G06F 17/00* (2006.01)
(52) U.S. Cl. ... 701/114; 701/104; 701/105; 123/198 DB
(58) Field of Classification Search .................. 123/299, 123/300, 305, 304, 674, 436, 675, 679, 445, 123/447, 448, 452, 456, 472, 480, 481, 486, 123/198 F, 198 DB; 73/114.25, 114.38, 114.42, 73/114.45, 114.46, 114.48, 114.49, 114.51; 702/96, 87, 90, 100, 142, 145, 146; 701/104, 701/105, 114
See application file for complete search history.

(56) References Cited

U.S. PATENT DOCUMENTS

| | | | | |
|---|---|---|---|---|
| 6,125,823 A | * | 10/2000 | Thomas | 123/464 |
| 6,328,014 B1 | * | 12/2001 | Bradshaw | 123/300 |
| 6,755,176 B2 | * | 6/2004 | Takeuchi et al. | 123/299 |
| 6,910,458 B2 | * | 6/2005 | Oki | 123/198 F |
| 6,988,030 B2 | * | 1/2006 | Asano et al. | 701/103 |
| 7,717,088 B2 | * | 5/2010 | Thomas | 123/478 |
| 2002/0100458 A1 | * | 8/2002 | Hafner et al. | 123/480 |
| 2004/0045536 A1 | * | 3/2004 | Hafner et al. | 123/480 |
| 2006/0107936 A1 | | 5/2006 | Mazet | |

FOREIGN PATENT DOCUMENTS

| | | |
|---|---|---|
| EP | 0947686 A2 | 10/1999 |
| EP | 1 450 029 A1 | 8/2004 |
| EP | 1 541 842 A1 | 12/2004 |

(Continued)

OTHER PUBLICATIONS

European Office Action dated Sep. 23, 2008, issued in counterpart EP Application No. 07119304.9.
EPO Search Report, dated Mar. 20, 2008, issued in counterpart EP Application No. 07119304.9.

(Continued)

*Primary Examiner* — Thomas N Moulis
*Assistant Examiner* — Raza Najmuddin
(74) *Attorney, Agent, or Firm* — Nixon & Vanderhye P.C.

(57) ABSTRACT

A fuel injection controller (incorporated in an engine control ECU) for controlling an injection operation of an injector has a program for executing injections in plural injection patterns including an injection pattern of a multiple injection in a certain order into a certain cylinder of the engine during non-injection operation and a program for obtaining sums of fluctuation degrees of an engine operating condition due to all the injections in a first injection unit composed of one (single stage injection) of the plural patterns and all the injections in a second injection unit composed of a different one (multiple injection of two stages) of the plural patterns which are executed by the former program, with an injection condition (cylinder number and data number N).

59 Claims, 8 Drawing Sheets

FOREIGN PATENT DOCUMENTS

| | | |
|---|---|---|
| JP | 2005-155360 | 6/2005 |
| JP | 2005-248739 | 9/2005 |
| JP | 2005-264810 | 9/2005 |
| JP | 2006-125370 | 5/2006 |
| WO | WO 99/61771 | 12/1999 |

OTHER PUBLICATIONS

Office Action (2 pgs.) dated Mar. 1, 2011 issued in corresponding Japanese Application No. 2006-294776 with an at least partial English-language translation thereof.

* cited by examiner

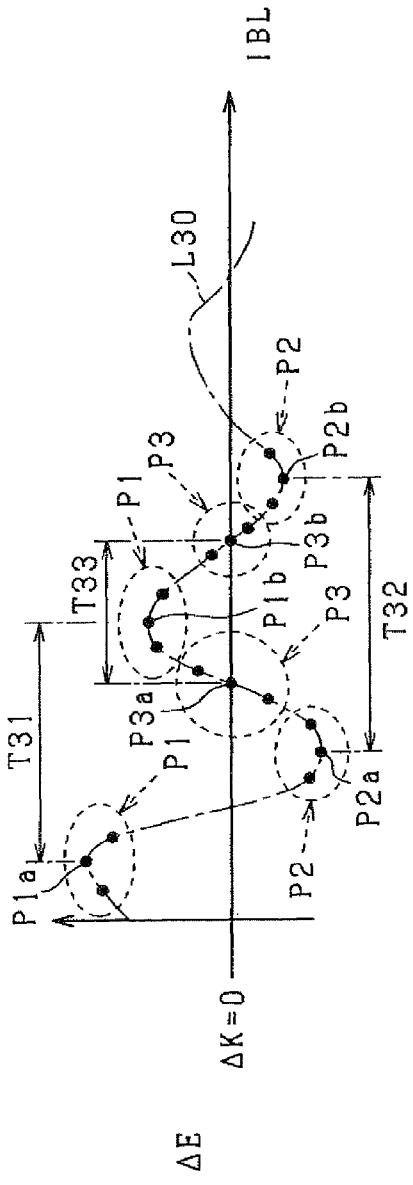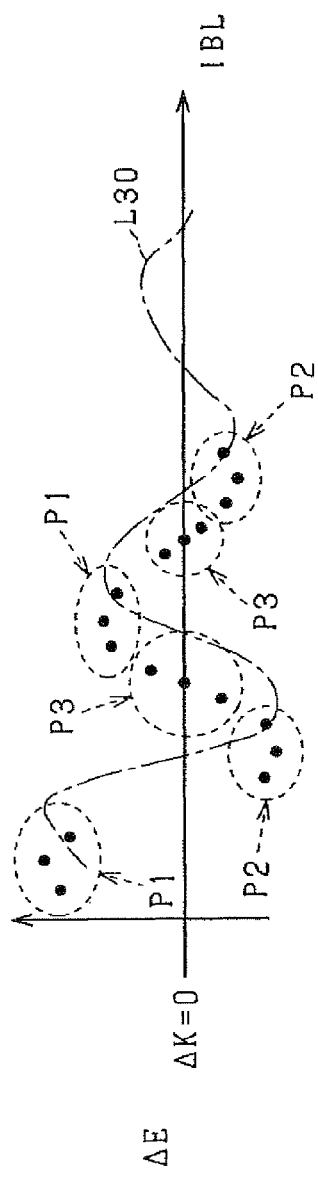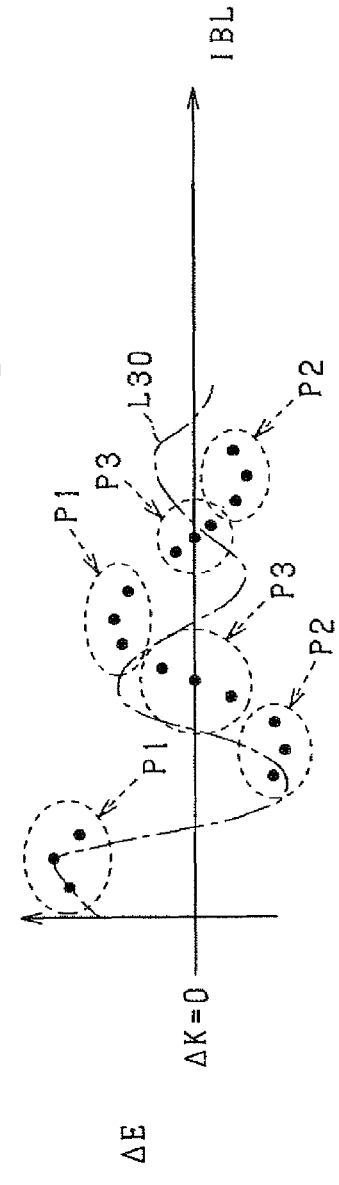
FIG. 12A
FIG. 12B
FIG. 12C

FUEL INJECTION CONTROLLER AND DIAGNOSIS METHOD OF FUEL SUPPLY SYSTEM

CROSS REFERENCE TO RELATED APPLICATION

This application is based on and incorporates herein by reference Japanese Patent Application No. 2006-294776 filed on Oct. 30, 2006.

BACKGROUND OF THE INVENTION

1. Field of the Invention

The present invention relates to a fuel injection controller for controlling an injection operation of an injector, which injects and supplies fuel to be used for combustion in an engine, and a diagnosis method of a fuel supply system of an engine including an injector for diagnosing whether or not the fuel supply system operates normally.

2. Description of Related Art

As well known, for example, an internal combustion engine used as a power source of an automobile or the like ignites and burns fuel injected and supplied from an injector to produce output torque. A diesel engine for an automobile or the like recently adopts an injection system, which is a so-called multiple injection system, of performing a sub-injection with an injection quantity smaller than a main injection before or after performing the main injection, which produces output torque during one combustion cycle. For example, today noises or an increase of a NOx emission quantity at the time of fuel combustion is seen as a problem. For solving this problem, there is a case of performing a pre-injection or a pilot injection with a small quantity of fuel before the main injection. In addition, there is a case where even after the main injection, for the purpose of activation of diffusion combustion or reduction in emission of particulate matter (PM), an after-injection is performed at injection timing close to that of the main injection. Further, there is a case where for the purpose of a rise of an exhaust gas temperature, activation of a catalyst by reduction constituent supply or the like, a post-injection is performed at injection timing retarded significantly from that of the main injection. A recent engine control adopts one or an arbitrary combination of these various injections to perform supply of fuel to the engine in an injection mode (injection pattern) more suitable for various situations.

Conventionally, there is widely used a fuel injection controller for controlling an injection operation of an injector to perform a multiple injection. This controller uses a map in which an injection pattern (adapted value) for each engine operating condition is written or a mathematical expression thereof to set an injection pattern in accordance with an engine operating condition at each time. This controller holds an optimal pattern (adapted value) obtained by experiments or the like concerning each engine operating condition assumed beforehand as the map or the mathematical expression (for example, stored and held in a ROM). This controller refers to the map or the mathematical expression and thereby sets an injection pattern in accordance with an engine operating condition. Besides, like a controller described in Patent Document 1 (JP-A-2005-264810), there is proposed a controller of changing an injection pattern by monitoring an engine operating condition.

Such use of the map in which the adapted value is written or the mathematical expression thereof enables supply of fuel to an engine in an injection mode (injection pattern) suitable for an engine operating condition at each time even in a case of a multiple injection as in the case of a single stage injection (main injection only). However, inventors of the present invention have confirmed that in a case of performing a multiple injection by using such a controller, a control error with respect to a target engine operating condition becomes larger than in a case of a single stage injection, due to sequential injections performed at short intervals, For example, each of injections sequentially performed (particularly a sub-injection with a smaller quantity of fuel other than a main injection) is subject to various influences caused by performing an injection before or after that injection. One of them is an influence of an injection characteristic of the injector, and more particularly, of an individual difference thereof.

For example, in a case of mass production of each element in an engine control system for mass sales a certain degree of the individual difference usually occurs in characteristics of various control components including the injector between engines or even between cylinders in a case of a multi-cylinder engine. In a case of the mass production, determination of an adapted value (optimal injection pattern) of each element (for example, all cylinders mass-produced and mounted in a vehicle) in consideration of the individual difference thereof requires too much time and too many jobs in the present production system, and therefore, is not realistic. Therefore, even in a case of using the map in which the adapted value is written or the mathematical expression, it is difficult to perform a control considering all influences of the individual difference.

Further, the inventors of the present invention have confirmed that yet in a case of the aforementioned multiple injection unlike a case of the single stage injection, the injection characteristic concerning the multiple injection (plural sequential injections) is subject to influence of the individual difference, besides a usual injection characteristic. Accordingly, it is required to consider the injection characteristic of the multiple injection in addition to that of the single stage injection for obtaining an aimed engine operation condition through the multiple injection with high precision. Therefore, in conventional controllers including the controller described in the aforementioned Patent Document 1, it is difficult to perform control of the engine operation condition with high precision, particularly in a case where the controller is applied to control of the multiple injection.

In a case of performing injection control with high precision, a characteristic change due to aging of control components or the like can not be ignored. In conventional controllers including the controller described in the aforementioned Patent Document 1, even if an optimal value is obtained at an initial stage with high precision, the influence of the subsequent characteristic change can not be known. Therefore, a deviation from the optimal value possibly occurs with an elapse of time. In this case, there may be adopted a scheme of beforehand obtaining an adapted value of a degradation coefficient (coefficient relating to the degree of aging degradation) by an experiment value or the like to possess the adapted value as a map or a mathematical expression. However, since the aforementioned individual difference exists for each component even concerning such an aging characteristic change, it is difficult to completely eliminate the influence.

SUMMARY OF THE INVENTION

It is an object of the present invention to provide a fuel injection controller and a diagnosis method of a fuel supply system capable of obtaining an injection characteristic at each time including an aging characteristic change to obtain an aimed engine operation condition through a multiple injection with high accuracy.

According to an aspect of the present invention, a fuel injection controller for controlling an injection operation of an injector injecting and supplying fuel to be used for combustion in an engine has an injection execution device and a fluctuation degree obtaining device. The injection execution device executes injections in plural injection patterns including at least an injection pattern of a multiple injection into a certain cylinder of the engine in a certain order at least on a condition that the certain cylinder of the engine is performing non-injection operation as one of execution conditions. The fluctuation degree obtaining device obtains at least a sum of fluctuation degrees of an engine operating condition or an equivalent thereof due to all injections of each of a first injection unit composed of one or a combination of the plural injection patterns and a second injection unit composed of different one or combination of the plural injection patterns with an injection condition.

The injection characteristic concerning the aforementioned multiple injection (plural sequential injections) differs between the injection patterns (injection modes of an injector). That is, for example, the fluctuation degree applied to the engine operating condition (a fluctuation amount of the engine operating condition caused by the fuel injection) differs, for example, between injection patterns having different injection stage numbers (for example, between single stage injection of one stage and multiple injection of two stages), between injection patterns having different injection periods, or between multiple injection patterns having different injection intervals. For example, in the case of the multiple injection pattern of two stages, there is a possibility that the fluctuation degree (fluctuation amount) of the engine operating condition caused by a latter stage injection is shifted to a positive side or a negative side by a former stage injection. The inventors of the present invention have confirmed that the shift amount or the shift direction (positive side or negative side) at this time changes depending on injection timing (start/end) or an injection period of each of the injections (former stage injection and latter stage injection), an injection interval between the injections (former stage injection and latter stage injection) and the like.

The inventors of the present invention have taken these points into account and have invented the above controller as a controller capable of determining (obtaining) the injection characteristic concerning the multiple injection at each time reflecting an aging characteristic change and the like. With this scheme, the fluctuation degree obtaining device can obtain the sum of the fluctuation degrees of the engine operating condition or the equivalent thereof (fluctuation degrees due to all injections included in an injection unit) concerning each injection unit of the plural patterns (one or a combination of the plural injection patterns and different one or combination of the plural injection patterns). The thus obtained sum of the fluctuation degrees of the engine operating condition or the equivalent (hereinafter, referred to as a fluctuation parameter) shows the degree of the fluctuation of the engine operation condition caused by each pattern (or combination of the patterns) and is an index for controlling the engine operating condition. The fluctuation parameter basically has a correlation with a total injection quantity injected through all the injections in the injection unit. Therefore, according to the above scheme, the fluctuation parameter is obtained with the injection condition (for example, at least one of a cylinder number, an injection pressure, an injection stage number, injection timing, an injection period and an injection interval concerning the injection or the like). In consequence, the injection characteristic at each time can be obtained. In this way, the data analysis through the data accumulation as well as correction of the injection characteristic or failure diagnosis of the fuel supply system including the injector can be performed easily and precisely.

In a case of obtaining the injection characteristic at each time, it is effective to perform comparison of the fluctuation parameters (for example, comparison started by a user or comparison automatically performed by certain device) of the injection units (corresponding to one or a combination of injection patterns), if necessary, after the fluctuation parameters are converted in a process preceding the comparison. In this way, it is possible to obtain the deviation degree (for example, difference, ratio or the like) of the fluctuation parameter of one of the compared injection units based upon the other one of the compare injection units. In addition, it is possible to obtain the injection characteristic at each time (particularly, injection characteristic concerning the multiple injection) based upon the deviation degree between the fluctuation parameters. It is preferable to use the other injection unit having a small error with respect to a true value (i.e., having high absolute correctness) as the reference of the comparison. With such the scheme, an absolute deviation degree of the fluctuation parameter of the one injection unit can be indirectly obtained by determining a relative deviation degree from the other injection unit.

The engine operating condition may include, in addition to an engine rotational speed, a combustion state (correlated with engine torque) detected by an in-cylinder pressure sensor or a knock sensor, for example. In addition, in place for the direct engine operating condition, an equivalent of the engine operating condition indirectly showing the engine operating condition such as a quantity of a specific exhaust component (for example, NOx) detected by a proper sensor (for example, NOx sensor) or the like or a behavior of a vehicle having the engine (for example, vehicle speed) may be used. Further, for accurately obtaining the engine operating condition, these parameters may be used in combination.

According to another aspect of the present invention, a diagnosis method of a fuel supply system of an engine obtains a degradation parameter showing a performance degradation degree of the fuel supply system to diagnose whether or not the fuel supply system including a injector injecting fuel to be supplied for combustion in the engine normally operates. The diagnosis method executes injections in plural kinds of injection patterns including at least an injection pattern of a multiple injection into a certain cylinder of the engine in a certain order through the injector at least on a condition that the certain cylinder is performing non-injection operation. The diagnosis method obtains and compares sums of fluctuation degrees of an engine operating condition or an equivalent thereof due to all injections in a first injection unit composed of one or a combination of the plural injection patterns and all injections in a second injection unit composed of different one or combination of the plural injection patterns. The diagnosis method obtains a deviation degree between the sums as the degradation parameter through the comparison.

This method enables the obtainment of the deviation degree of the fluctuation parameter as the degradation parameter. It is possible to detect the injection characteristic of each time (particularly, injection characteristic concerning the multiple injection) based on the deviation degree.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

FIGS. 12A to 12C are time charts showing correction modes of the correction processing of FIG. 11.

DETAILED DESCRIPTION OF EXAMPLE EMBODIMENT

Hereinafter, a fuel injection controller and a diagnosis method of a fuel supply system according to an embodiment of the present invention will be described with reference to the accompanying drawings in detail. Here, an automobile (diesel vehicle) equipped with a diesel engine (internal combustion engine) as a power source, particularly a manually operational transmission vehicle equipped with a manual transmission (MT) to which this controller of the present embodiment is applied, will be described.

Figure 1:
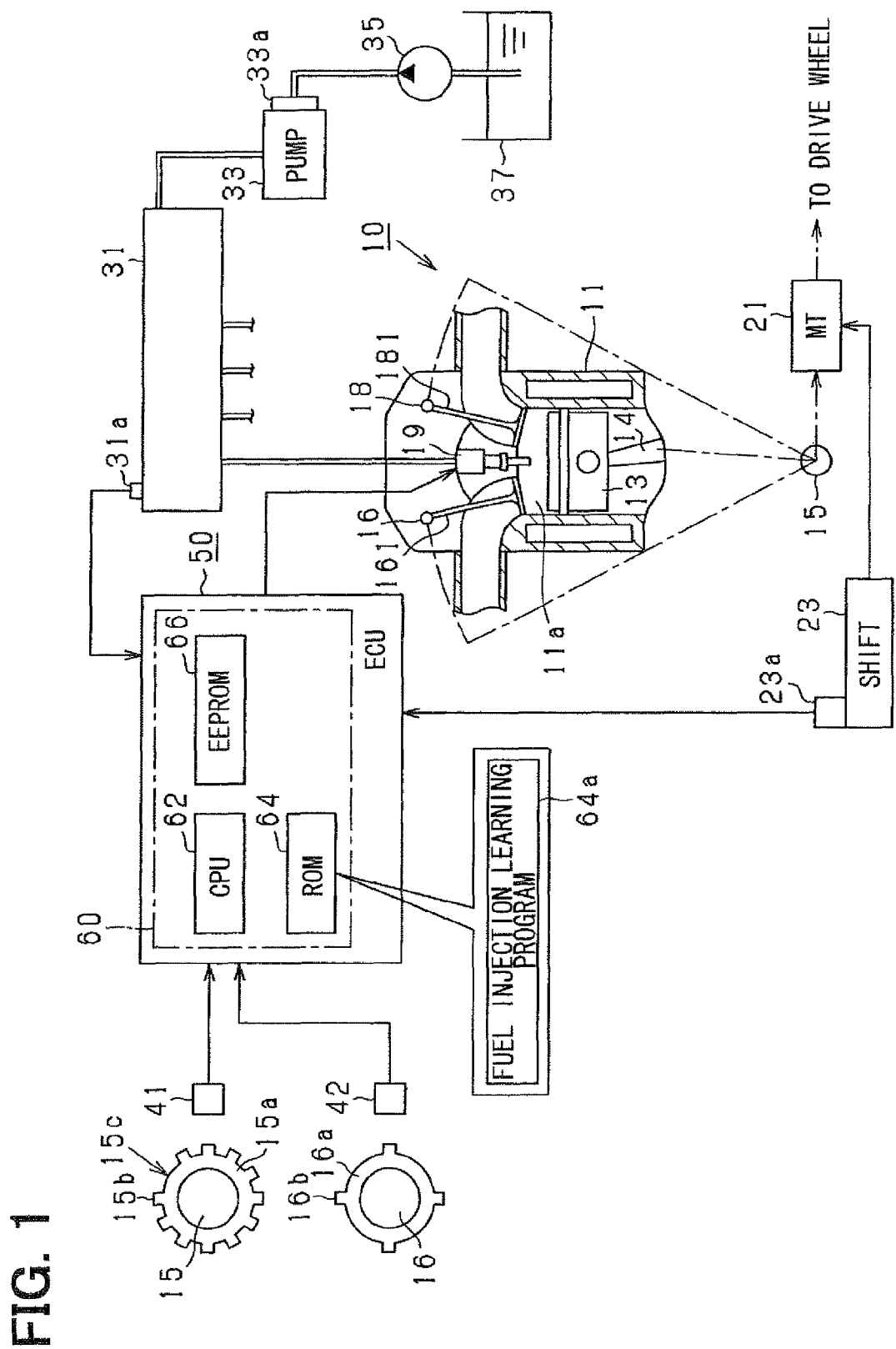
FIG. 1 is a schematic diagram showing an engine control system including a fuel injection controller according to an embodiment of the present invention.

First, by referring to FIG. 1, a detail of an engine system to which this controller is applied will be explained. FIG. 1 is a construction diagram showing a schematic construction of a vehicular engine control system to which a fuel injection controller according to the present embodiment is applied. A multi-cylinder reciprocal engine is assumed as an engine of the present embodiment, but in FIG. 1 only one cylinder (among cylinders #1 to #4) is illustrated for explanatory convenience. As shown in FIG. 1, the engine control system is applied to a reciprocal diesel engine 10 as a control object equipped with a common rail type fuel injection controller and is constructed of various sensors, an ECU 50 (electronic control unit) and the like for controlling the engine 10. Here, the engine 10 as the control object is basically constructed so that a piston 13 is accommodated in each of cylinders 11 (only one cylinder is illustrated for convenience) formed by a cylinder block. The piston 13 is connected via a connecting rod 14 to a crankshaft 15 as an output shaft of the engine 10. Combustion of light oil in combustion chambers 11a in the cylinders 11 causes reciprocal movements of the pistons 13 in the respective cylinders in order, thereby creating rotation of the crankshaft 15 provided in common to the pistons 13.

An intake pipe (intake passage) and an exhaust pipe (exhaust passage) are provided to a combustion chamber 11a in the cylinder 11 in such that the intake pipe and the exhaust pipe communicate with the combustion chamber 11a and connection portions (opening) thereof are opened/closed by an intake valve 161 and an exhaust valve 181. The intake valve 161 and the exhaust valve 181 are driven in accordance with rotation of cams provided to camshafts 16, 18 (valve operating camshafts). The camshafts 16, 18 are mechanically linked with the crankshaft 15. The engine 10 of this system is a four-stroke engine and each of the camshafts 16, 18 performs one rotation while the crankshaft 15 performs two rotations (720° CA rotation).

The crankshaft 15 is provided with a rotor 15a as shown in an enlarged scale next to the ECU 50 in FIG. 1. The rotor 15a has plural detected portions 15b (teeth). The teeth 15b are formed on the rotor 15a basically at substantially equal intervals (30° CA in the present embodiment) and a tooth-removed portion 15c is provided on one location of the intervals of the rotor 15a. A crank angle sensor 41 for detecting an engine rotational speed (equivalent to a rotational speed of the crankshaft 15) or the like is provided in the vicinity of the crankshaft 15. The crank angle sensor 41 includes, for example, an electromagnetic pickup sensor for sequentially detecting the passing of the teeth 15b. On the occasion of detecting the engine rotational speed, since the rotor 15a including the teeth 15b is rotated by rotation of the crankshaft 15, the passing of the teeth 15b is sequentially detected by the crank angle sensor 41. Thereby an angular position or the rotational speed of the crankshaft 15 can be detected based upon the sensor output.

The camshaft 16 for driving the intake valve 161 is provided with a rotor 16a. The rotor 16a also has plural detected portions 16b (teeth). In FIG. 1, an example of the rotor 16a having four teeth 16b formed at equal intervals is shown. A cam angle sensor 42 (so-called G sensor) used for identifying cylinders or the like is provided near the camshaft 16. The cam angle sensor 42 includes, for example, an electromagnetic pickup sensor or the like. On the occasion of identifying the cylinder, the cylinder of the engine 10 can be identified (one out of the four cylinders can be identified) by sequentially detecting the passing of the teeth 16b with the cam angle sensor 42.

The crankshaft 15 is also mechanically linked with drive wheels (vehicle wheels running on a road) via a clutch of a manual transmission (MT) 21 as a manually operational type transmission. That is, when a driver manually disengages the clutch of the MT21, the linkage between the crankshaft 15 and the drive wheels can be mechanically cut. A portion, with which a shift position operation is performed by the driver, is a shift operational portion 23. The shift position of the MT21 is changed with an operation of the shift operational portion 23. The shift operational portion 23 is provided with a shift position sensor 23a for detecting the shift operational position.

An injector 19 as an electromagnetic driven type (or piezo driven type) injector for injecting/supplying fuel (light oil) used for combustion in the combustion chamber 11a is provided to the combustion chamber 11a in the cylinder 11. The injector 19 transmits a drive force to a needle via a hydraulic chamber to cause a reciprocal motion of the needle, opening and closing the injector 19. Here, for explanatory convenience, only the injector 19 provided in one cylinder (cylinder 11) is illustrated, but such the injectors are provided in the respective cylinders of the engine 10.

Each injector of the engine 10 is connected to a common rail 31 as an accumulator delivery pipe via a high-pressure fuel delivery pipe. The common rail 31 is provided with a common rail pressure sensor 31a disposed therein which can detect a fuel pressure (common rail pressure) in the common rail 31. An electromagnetic driven type (or mechanical type) pressure-reducing valve (not shown) is provided to the common rail 31. When the common rail pressure is excessively increased, this pressure-reducing valve is opened to reduce the pressure.

A high-pressure pump 33 as a fuel supply pump is connected to the common rail 31. An electromagnetic driven type suction control valve (SCV) 33a is provided in a fuel suction portion of the high-pressure pump 33 in a fuel supply system, low-pressure fuel suctioned from a fuel tank 37 by a feed pump 35 is suctioned into a fuel chamber of the high-pressure pump 33 via the suction control valve 33a. The high-pressure fuel is sequentially supplied to the common rail 31 from the high-pressure pump 33 and the high-pressure fuel equivalent to an injection pressure is accumulated in the common rail 31. The high-pressure pump 33 repeats suction and discharge of fuel by a drive shaft in association with rotation of the crankshaft 15. For example, the drive shaft rotates at a ratio of 1/1 or ½ to a rotational speed of the crankshaft 15.

In the engine 10, the fuel thus accumulated in the common rail 31 is injected and supplied to each cylinder by a predetermined quantity by valve-opening drive of the injector 19 as needed. During engine operation, intake air is introduced from the intake pipe into the combustion chamber 11a of the cylinder 11 by an opening movement of the intake valve 161 and is mixed with fuel injected and supplied from the injector 19. The mixture is compressed by the piston 13 in the cylinder 11, so the mixture ignites (via self ignition) and burns. Exhaust gas produced by the combustion is discharged to the exhaust pipe by an opening movement of the exhaust valve 181.

A component for primarily performing an engine control as an electronic control unit in such a system is the ECU 50. The ECU 50 is formed of a well-known microcomputer 60. The ECU 50 obtains an engine operating condition of the engine 10 and requests from a user based upon detection signals of various sensors and controls various actuators such as the injector 19 in response to the condition and the requests to perform various controls concerning the engine 10 in the optimal mode for the situation of each time. The microcomputer 60 mounted in the ECU 50 is formed basically of various calculation devices, memory devices, communications devices and the like such as CPU (basic processing device) 62 for performing various calculations, RAM (Random Access Memory, not shown) as a main memory for temporarily storing data in process of the calculation or the calculation result, ROM (read only memory) 64 as a program memory, EEPROM (electrically rewritable nonvolatile memory) 66 as a data storage memory, backup RAM (not shown) (RAM energized by a backup power source such as a vehicular battery) and input/output ports (not shown) for inputting/outputting signals from/to an outside of the microcomputer 60. Various programs, control maps and the like concerning the engine control including a fuel injection learning program 64a of fuel injection learning control are beforehand stored in the ROM 64. Various control data and the like including design data of the engine 10 are beforehand stored in the data storage memory (EEPROM 66).

Figure 2:
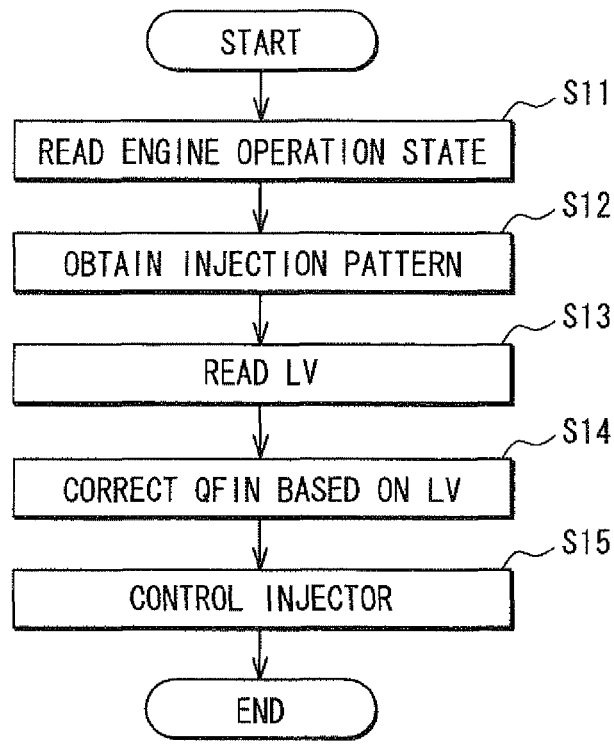
FIG. 2 is a flowchart showing basic steps of fuel injection control processing according to the embodiment.

The system according to the present embodiment sequentially learns (updates) a correction coefficient in accordance with the situation of each time to correct (through feedback correction) a control error due to the aforementioned individual difference, the aging change or the like. Next, referring to FIG. 2, basic processing steps of fuel injection control according to the present embodiment will be explained. Values of various parameters used in the processing in FIG. 2 are stored as needed in memory devices such as the RAM, the EEPROM or the backup RAM mounted in the ECU 50 and are updated at any time when needed. The series of the processes in each figure is sequentially executed at each predetermined crank angle or in a predetermined time cycle for each cylinder of the engine 10 by executing programs stored in the ROM with the ECU 50.

In the series of the processes, as shown in FIG. 2, first at S11, various parameters showing an engine operating condition such as an engine rotational speed (average rotational speed) or an engine load are read. Next at S12, an injection pattern is set based upon the engine operating condition read at S11 or an accelerator pedal depressing amount provided by a driver (or by separately calculating a request engine operation state if necessary). The injection pattern is obtained based upon a certain map or the like (for example, stored and held in ROM 64). In detail, an optimal pattern (adapted value) is obtained by experiments or the like concerning each engine operating condition assumed beforehand. Thus, a relation between the engine operating condition and the optimal pattern is written in a map (or is defined with a mathematical expression). The injection pattern is defined by parameters such as an injection stage number (injection time number), injection timing, an injection period and an injection interval (injection interval in a case of a multiple injection). At S12, the optimal pattern (adapted value) is set to satisfy a request engine operating condition in accordance with an engine operating condition at each time (obtained at S11). For example, the injection quantity (injection period) in a case of the single stage injection or a sum of injection quantities of respective injections in a case of the injection pattern of the multiple injection is variably set in accordance with the request torque or the like. A command value (command signal QFIN) to the injector 19 is set based upon the injection pattern. Thus, the aforementioned pre-injection, the pilot injection, the after injection, the post-injection or the like is performed with the main injection in accordance with a state of the vehicle.

Then, at S13, a correction coefficient LV updated by a separate learning processing is read out from the EEPROM 66 and then, at S14, a command value (command signal QFIN) to the injector 19 is corrected based upon the read correction coefficient LV. In addition, at following S15, command values concerning the injection stage number, the injection timing, the injection period, the injection interval and the like are determined based upon the corrected command value (command signal QFIN) and the drive of the injector 19 is controlled based upon the command values.

Next, referring to FIGS. 3 to 12, a learning mode (updating mode) of the correction coefficient LV used at S14 in FIG. 2 will be described in detail. Values of various parameters used in the series of the processes shown in FIGS. 3, 4, 10 and 11 are stored as needed in the memory devices such as the RAM, the EEPROM or the backup RAM mounted in the ECU 50 and are updated at any time when needed. The series of the processes in each figure is sequentially executed at each predetermined crank angle or in a predetermined time cycle for each cylinder of the engine 10 basically by executing programs stored in the ROM with the ECU 50.

The processing of learning (updating) the correction coefficient LV by the device of the present embodiment (ECU 50) is basically composed of the following two processing.

(1) Learning processing: In regard to injections of a certain injection pattern, a sum (hereinafter, referred to as fluctuation parameter) of fluctuation degrees of an engine operating condition due to all injections included in the injection pattern is obtained and the obtained fluctuation parameter is stored in a certain memory device (here, EEPROM 66) in association with the injection condition such as the injection pattern at each time.

(2) Correction processing: A correction coefficient of fuel supply (fuel injection) beforehand stored in a certain memory device (here, EEPROM 66) is updated based upon the fluctuation parameter stored in the memory device by the learning processing.

Figure 3:
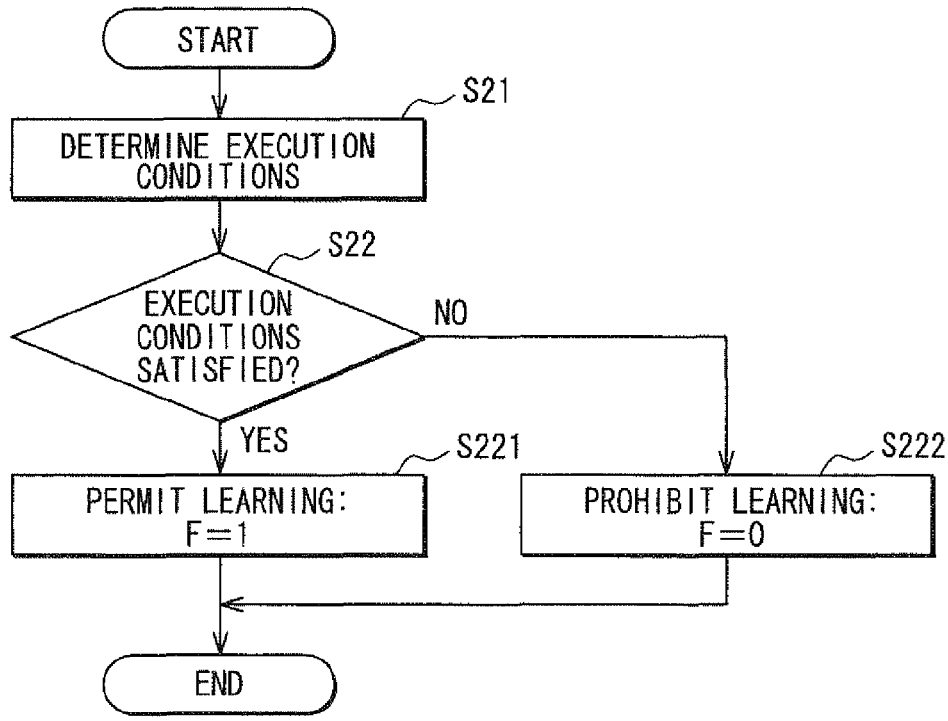
FIG. 3 is a flowchart showing steps of processing concerning an execution condition of learning processing according to the embodiment.
Figure 4:
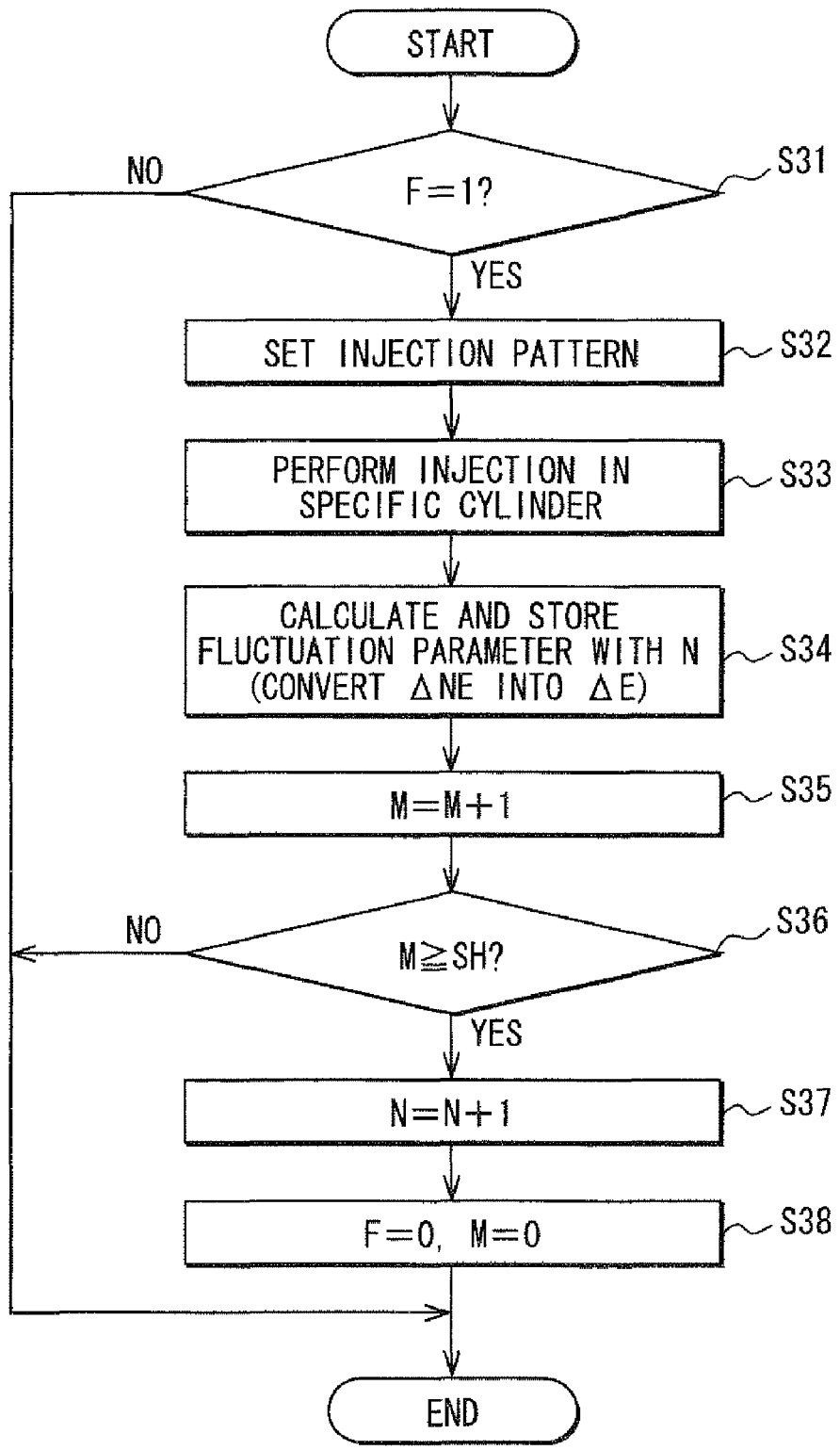
FIG. 4 is a flowchart showing the learning processing according to the embodiment.

Next, by referring mainly to FIGS. 3 and 4, the learning processing will be described in detail. Each of FIGS. 3 and 4 is a flowchart showing the process steps of the learning processing. In detail, in the processing shown in FIG. 3, it is determined whether or not an execution condition (learning execution condition) of the learning processing is satisfied. Only when the execution condition is satisfied, the learning processing as a series of the processes shown in FIG. 4 is executed.

As shown in FIG. 3, in the processing in FIG. 3, first at S21, it is determined whether or not each of the following conditions is satisfied:

(1) Condition that an injection pressure (common rail pressure) is within a predetermined range. The injection pressure is detected by the common rail pressure sensor 31a or the like.

(2) Condition that the rotational speed NE of the engine 10 (rotational speed of the crankshaft 15) is within a predetermined range. The engine rotational speed NE is detected by the crank angle sensor 41 or the like.

(3) Condition that the engine is in not in a transient operating condition. For example, it is determined that the engine 10 is not in the transient operating condition when a deviation of the engine rotational speed NE (rotational speed deviation) is smaller than a predetermined threshold value (for example, 100 rpm) and also a deviation of an accelerator pedal depressing amount (accelerator deviation) is smaller than a predetermined threshold value (for example, 5%). The deviation of each of the engine rotational speed and the accelerator pedal depressing amount can be obtained by comparing a value (i.e., previous value), which is measured immediately before and is stored in the memory device (for example, RAM), and a presently measured value (present value) (i.e., by subtracting the previous value from the present value) as an absolute value of the difference between the measured values.

(4) Condition that the engine 10 is performing non-injection operation (i.e., the engine 10 is decelerating). The engine 10 is brought to a decelerating state and fuel cut (non-injection operation) is performed if the depressing amount of the accelerator pedal is set to 0 (non-depression state) in a state where the engine 10 is sufficiently accelerated during a general engine control. In the present embodiment, the fuel cut control is performed.

(5) Condition that each sensor concerning the learning processing is normal.

At following S22, it is determined whether or not the learning execution condition is satisfied based upon the determination result at S21. In detail, at S22 it is determined whether or not all the above-described conditions (1) to (5) are simultaneously satisfied. If S22 is YES, it is determined that the execution condition is satisfied. In this case, at following S221, a learning permission flag is set at 1 (F=1). Thereafter, the series of the processes in FIG. 3 ends. If S22 determines that even one of all the conditions (1) to (5) is not satisfied, it is determined that the execution condition is not satisfied. In this case, at S222, the learning permission flag is set at 0 (F=0). Thereafter, the series of the processes in FIG. 3 ends.

In the processing shown in FIG. 4, process at S31 is repeated until the execution condition is satisfied. At S31, it is determined whether or not the execution condition is satisfied, that is, whether or not the learning permission flag F is set at 1. When the learning permission flag F is set at 1 by a series of the processes in FIG. 3 and S31 determines that the learning permission flag F is set at 1, the process goes to S32. At S32, the injection pattern is set based upon a certain table (one-dimensional map) or the like. In detail, in this table, an injection pattern (injection stage number (injection time number), injection timing, injection period, injection interval and the like) equal to (or corresponding to) an injection pattern (control map) used in control during a normal operation of the engine 10 is defined for each data number N (initial value is 1), for example. That is, in the first execution, the injection pattern of the data number 1 is set based on the table.

At following S33, fuel is injected to a specific cylinder (for example, first cylinder #1) as an object among the four cylinders #1 to #4 of the engine 10 based upon the injection pattern set at S32. The fuel injection is performed through the injector 19. At following S34, a sum (hereinafter, referred to as fluctuation parameter) of fluctuation degrees of the engine operating condition due to the injections (all injections) performed at S33 is calculated and the calculated fluctuation parameter is stored in the EEPROM 66 together with the data number N. The fluctuation parameter is calculated based upon the engine rotational speed NE at each time detected separately (in the 720° CA cycle, for example).

At following S35, a counter M indicative of the number of the injection execution times is incremented (M=M+1). The initial value of the counter M is 0. At following S36, by comparing the counter M with a predetermined threshold value SH (for example, 10), it is determined whether or not the injections are performed to a certain number of the times (=threshold value SH). When it is determined at S36 that a value of the counter M is less than the threshold value SH (M<threshold value SH), the series of the processes in FIG. 4 ends once. Thereafter, if the learning execution condition is still satisfied, via the processes of S31 to S35 once more, the execution of the fuel injection and the increment of the counter M are performed in that order. The processes of S31 to S35 are thus repeatedly executed until the injections are performed to the certain number of the times (=threshold value SH). In regard to one injection pattern (pattern of the data number N), the injections of the certain number of times (=threshold value SH) are performed and the certain number (threshold value SH) of the fluctuation parameters are stored in the EEPROM 66. Then, at S36 it is determined that the value of the counter M is equal to or greater than the threshold value SH (M≧threshold value SH) and the process goes to following S37.

When the certain number (=threshold value SH) of the fluctuation parameters are thus obtained in regard to the injection pattern of the data number 1, then the data number N is incremented at S37 (N=N+1) for obtaining a certain number (=threshold value SH) of the fluctuation parameters in regard to the injection pattern of the data number 2. At following S38, the learning permission flag F and the counter M are reset (set to 0 respectively) and the series of the processes in FIG. 4 ends once. Thereafter, if the learning execution condition is still satisfied, again via the processes of S31 to S37, the fluctuation parameters of a certain number of times (=threshold value SH) are obtained in regard to the injection pattern of the data number 2.

In the present embodiment, the fuel injections based on the respective injection patterns beforehand defined in a table are sequentially performed as described above. The sum (fluctuation parameter) of the fluctuation degrees of the engine operating condition due to all the injections (all injections during the pattern) for each injection pattern is obtained and stored with the injection condition (the data number N showing the injection pattern).

Figure 5:
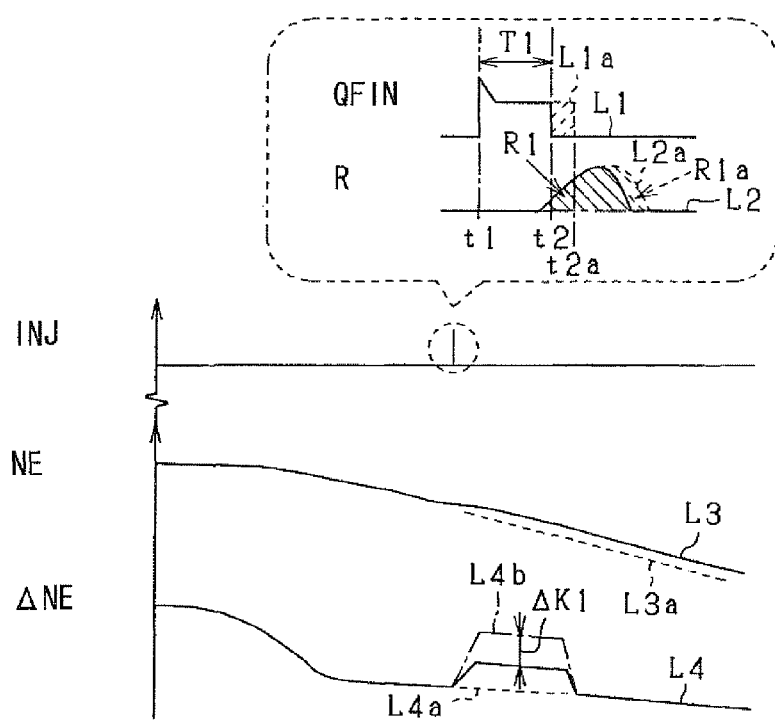
FIG. 5 is a time chart showing an example of an injection pattern used in the learning processing, an engine rotational speed concerning the injection pattern and a transition of a fluctuation degree of the engine rotational speed according to the embodiment.
Figure 6:
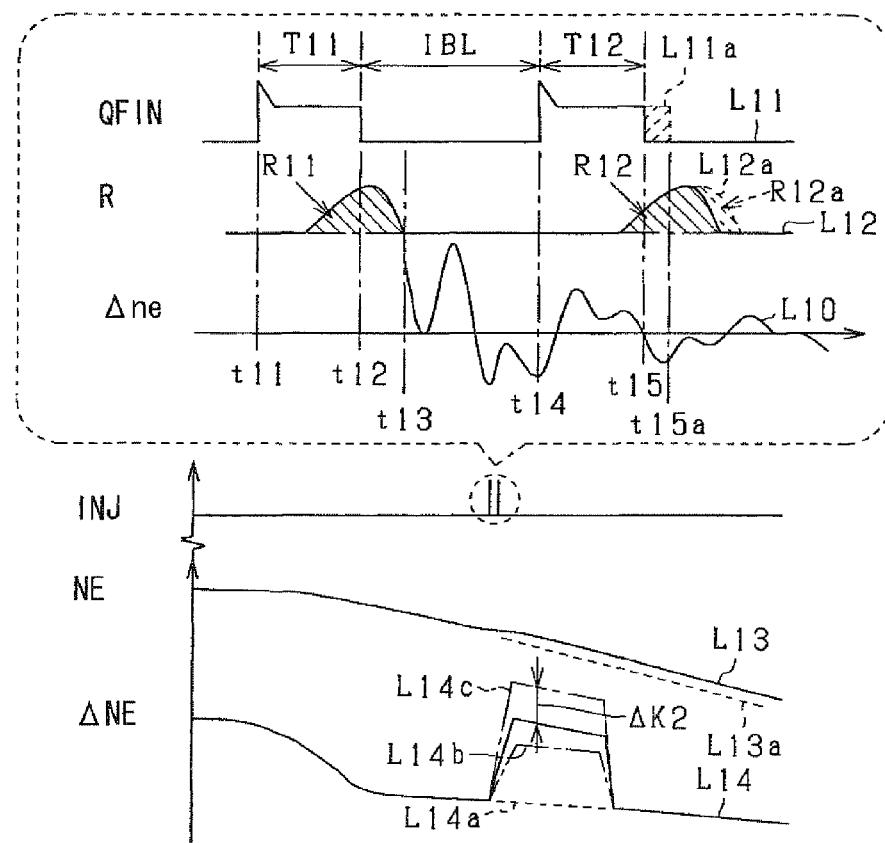
FIG. 6 is a time chart showing an example of an injection pattern used in the learning processing, an engine rotational speed concerning the injection pattern and a transition of a fluctuation degree of the engine rotational speed according to the embodiment.

Next, by referring to FIGS. 5 and 6, a fuel injection mode by the processes in FIG. 4 will be explained. Each of FIGS. 5 and 6 is a time chart illustrating an example of the injection pattern (INJ) set at S32 in FIG. 4 and transitions of the engine operating condition (NE) and the fluctuation parameter ($\Delta$NE) in the vicinity of the injection timing due to the injection pattern. As shown in each of the figures, each example detects the engine rotational speed NE as the engine operating condition. In the present embodiment, the injection illustrated in FIG. 5 is performed as the injection pattern of the data number 1, and thereafter, the injection illustrated in FIG. 6 is performed as the injection pattern of the data number 2.

First by referring to FIG. 5, the injection pattern of the data number 1 will be explained. In FIG. 5, QFIN shows an injection command (command signal to the injector 19), and R shows an injection rate (fuel quantity injected per unit time). As shown by solid lines L1 and L2 in FIG. 5, this injection pattern is a single stage injection of a small quantity of fuel with one injection stage. In detail, this pattern consists of an injection with injection start timing t1 injection end timing t2 and a short injection period T1 (=t2−t1). When the injection is performed by the injection command QFIN (pulse width is equivalent to an energization period of the injector 19) shown by the solid line L1 in FIG. 5, the injection rate characteristic R shown by the solid line L2 in FIG. 5 is obtained. As a result, the fuel of a quantity (injection quantity) shown by a region R1 in the injection rate characteristic R is injected. The injection rate characteristic R is not measured in the actual engine control. When the injection rate characteristic is necessary, it can be estimated based upon, for example, the command signal QFIN. In addition, by using a well-known in-cylinder pressure sensor, it is possible to directly determine the injection rate characteristic R including actual injection start timing and injection end timing with a higher accuracy. At the time of the injection, a movement delay of the injector 19 occurs. That is, a certain delay occurs from timing of the command (a rise edge or a decay edge of the pulse QFIN shown in FIG. 5) to timing of start or completion of the fuel injection movement of the injector 19 (execution or stop of the fuel injection shown in the injection rate R of FIG. 5).

With this injection, the engine rotational speed NE changes (fluctuates) from a value as of non-injection shown by a broken line L3a in FIG. 5 to a value shown by a solid line L3 In FIG. 5, a fluctuation mode of the engine rotational speed NE is shown as a transition of a sum (fluctuation parameter $\Delta$NE) of fluctuation degrees of the engine rotational speed NE due to this injection. As shown in FIG. 5, by the injection in the injection pattern concerning the data number 1, a positive fluctuation arises to the engine rotational speed NE as of the non-injection that has been stable during the deceleration. That is, a fluctuation from a value as of the non-injection shown by a broken line L4a in FIG. 5 to a value shown by a solid line L4 occurs.

Next, by referring to FIG. 6, the injection pattern of the data number 2 will be explained. In FIG. 6, QFIN shows an injection command and R shows an injection rate. $\Delta$ne in FIG. 6 shows an influence (surge characteristic) applied by the former injection to the fluctuation degree (fluctuation amount) of the engine operating condition caused by the later injection in the multi injection in a time chart.

As shown by solid lines L11 and L12 in FIG. 6, this injection pattern is a multiple injection of two stages of fuel injections of small quantities. The former stage injection and the latter stage injection are performed during one combustion cycle (period of 720° CA). In detail, the injection pattern consists of the former stage injection (first stage injection) with injection start timing t11, injection end timing t12 and a short injection period T11 (=t12−t11) and a latter stage injection (final stage injection) with injection start timing t14, injection end timing t15, and a short injection period T12 (=t15−t14). The injection interval between the both injections is set at an injection interval IBL as shown in FIG. 6. Each injection of the former stage and the latter stage is set as the same pattern as the injection pattern of the data number 1, that is, set with the injection start timing t1 (=t11=t14), the injection end timing t2 (=t12=t15), and the injection period T1 (=T11=T12).

If the injection is performed with the injection command QFIN shown by the solid line L11 in FIG. 6, the injection rate characteristic R shown by the solid line L12 in FIG. 6 is obtained. As a result, the fuel of a quantity (injection quantity) shown by regions R11 and R12 in the injection rate characteristic R is injected as the injections of the former stage and the latter stage. The movement delay in the injector 19 occurs also on the occasion of injections in the former stage and the latter stage.

With the injections, the engine rotational speed NE changes (fluctuates) from a value as of non-injection shown by a broken line L13a in FIG. 6 to a value shown by a solid line L13. In FIG. 6, a fluctuation mode of the engine rotational speed NE is shown as a transition of a sum (fluctuation parameter $\Delta$NE) of fluctuation degrees of the engine rotational speed NE due to all the injections (injections of the former stage and the latter stage) included in the injection pattern.

As shown in FIG. 6, also in this case, due to all the injections of the injection pattern corresponding to the data number 2, a positive fluctuation arises to the engine rotational speed NE as of the non-injection that has been stable during the deceleration. That is, a fluctuation from a value as of the non-injection shown by a broken line L14a in FIG. 6 to a value shown by a solid line L14 occurs. In the injection pattern of the data number 2, there is a case where the fluctuation degree (fluctuation amount) of the engine operating condition caused by the injection of the latter stage is shifted (i.e., fluctuated) to a positive side or a negative side because the injection of the former stage is performed. A solid line L10 in FIG. 6 occurring from the end of the former stage injection (at timing t13) shows the influence degree $\Delta$ne (surge characteristic) of the injection of the former stage. The characteristic shown in FIG. 6, that is, a shift amount or a shift direction (positive side or negative side) of the latter stage injection characteristic due to the former stage injection changes in accordance with the injection timing (start and end), the injection period, the injection interval and the like of the both injections (injections of the former stage and the latter stage).

Figure 7:
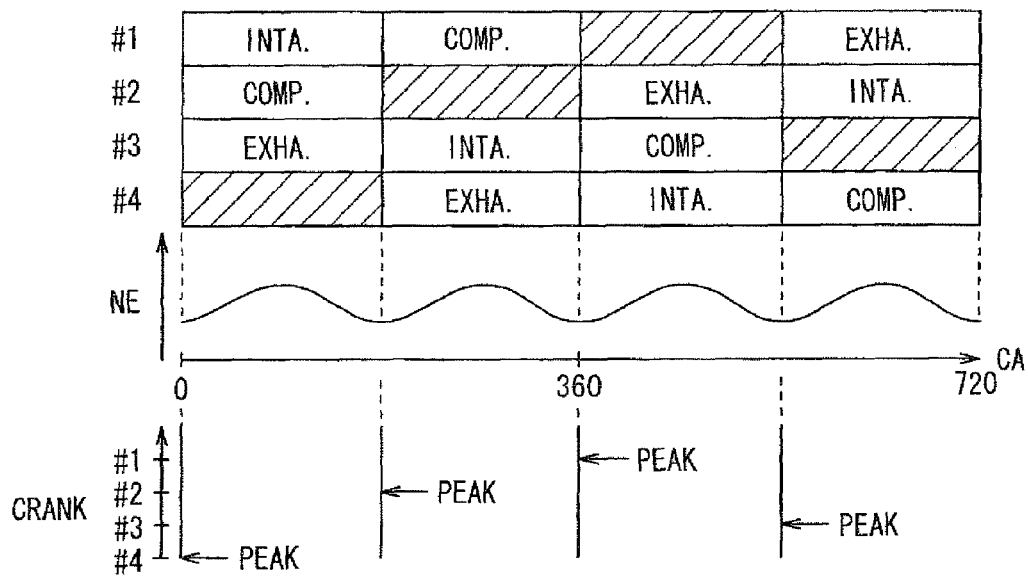
FIG. 7 is a diagram showing operation modes of respective cylinders according to the embodiment.

Next, by referring to FIGS. 7 to 9, a calculation mode of the fluctuation parameter $\Delta$NE at S34 of FIG. 4 will be explained. First, by referring to FIG. 7, an operation mode of each of the cylinders #1 to #4 (first cylinder to fourth cylinder) of the engine 10 will be explained. FIG. 7 shows combustion cycles of the cylinders #1 to #4 and transitions of the position of the crankshaft 15 and the engine rotational speed NE accompanying the progress of the combustion cycles. Since the execution of the learning processing assumes the state of the fuel cut (non-injection), the combustion stroke is omitted in FIG. 7. In FIG. 7, reduction of the engine rotational speed NE due to the fuel cut is ignored for explanatory convenience. As shown in FIG. 7, in the engine 10 as the four-stroke engine, a combustion cycle consisting of four strokes of an intake stroke (INTA), a compression stroke (COMP), a combustion stroke and an exhaust stroke (EXHA) is sequentially performed in 720° CA cycle. The engine rotational speed NE periodically becomes the minimum in the vicinity (crankshaft position=peak) of TDC (top dead center) of each cylinder in accordance with the advance of the combustion cycle.

Next, by referring to FIGS. 8 and 9, a detection mode and a calculation mode of the fluctuation degree ΔNE of the engine rotational speed NE will be explained. FIGS. 8 and 9 are time charts each showing transitions of the engine rotational speed NE and the fluctuation degree thereof (fluctuation parameter ΔNE) before and after performing the fuel injection at S33 of FIG. 4. Here, the transition of the engine rotational speed NE including a reduction amount of the engine rotational speed NE due to the fuel cut is shown. Each of timings shown by #1 and #3 in each figure shows TDC (top dead center) of each of the first and third cylinders.

Figure 8:
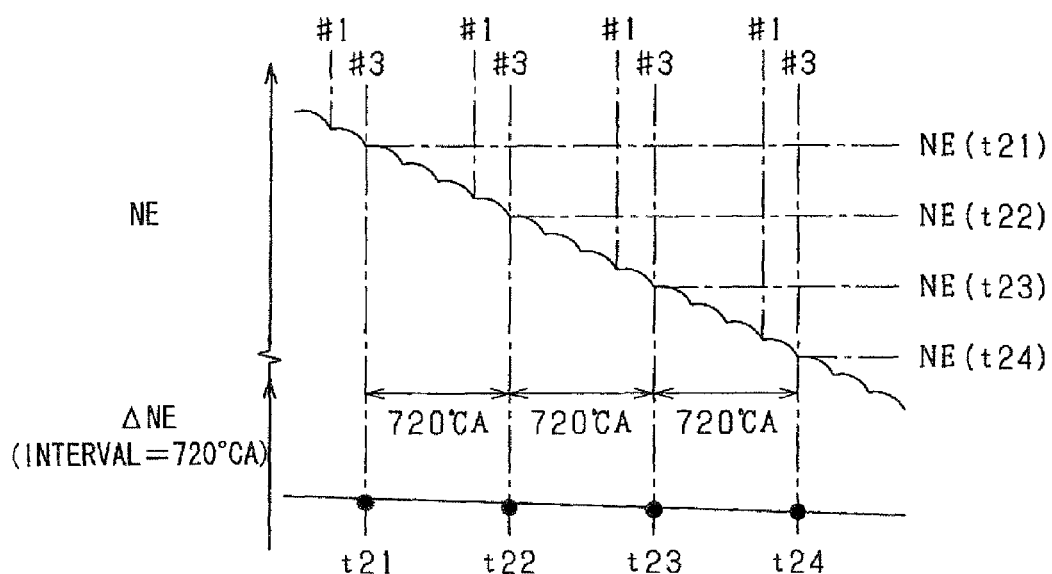
FIG. 8 is a time chart showing transitions of the engine rotational speed and the fluctuation degree of the engine rotational speed before fuel injection according to the embodiment.

As shown in FIG. 8, in the present embodiment, the engine rotational speed NE at each time is detected at 720° CA cycle. In detail, at timings t21, t22, t23, t24 corresponding to the TDC of the third cylinder #3, the engine rotational speeds NE(t21), NE(t22), NE(t23), NE(t24) are obtained and the fluctuation parameter ΔNE at each time is calculated based upon the engine rotational speed NE at each time.

The engine rotational speed NE at each time can be sequentially detected based upon the rotational speed of the crankshaft 15 detected by the crank angle sensor 41 for example. The engine rotational speed NE can be also detected with high accuracy by the rotational speed of the camshaft 16 detected by the cam angle sensor 42. In the present embodiment, the engine rotational speed NE is sequentially (in 720° CA cycle) detected based upon either one (or both) of the rotational speed of the crankshaft 15 and the rotational speed of the camshaft 16. Further at this time, whether or not the detection timing of the engine rotational speed NE is reached is determined based upon the rotational angle of the valve operating camshaft 16 rotating in synchronization with the movement of the intake valve 161 (or exhaust valve) of the engine 10 or the rotational angle of the crankshaft 15 linked with the valve operating camshaft 16. Based upon this determination, the engine rotational speed NE at the time when it is determined that the detection timing of the engine rotational speed is reached is detected.

Next, by taking a case after the fuel injection shown in FIG. 9 as an example, a calculation mode of the fluctuation parameter ΔNE will be explained in detail. As shown in FIG. 9, in this example, the aforementioned injection (at S33 of FIG. 4), that is, the fuel injection to the first cylinder #1, is performed at timing t23a immediately before the timing t23. The injection timing t23a in this example corresponds to the TDC of the first cylinder #1 as the object of the injection. For example, in the case of performing the single stage injection shown in FIG. 5, the injection start timing t1 is set so that an actual injection start is close to the TDC in consideration of the movement delay of the injector 19. In the case of performing the multiple injection shown in FIG. 6, the injection start timing t14 is set so that the injection start of the latter stage injection (corresponding to the injection of the final stage) is close to the TDC.

Figure 9:
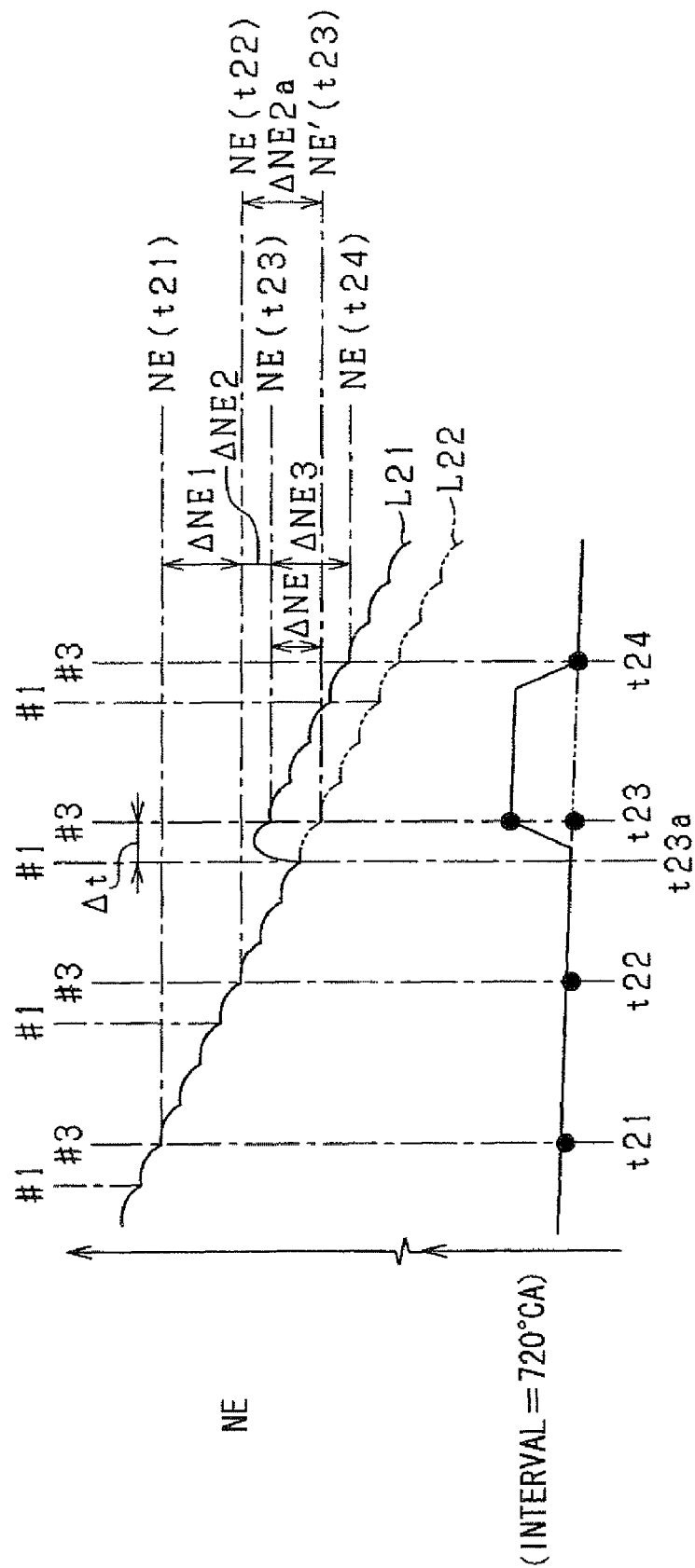
FIG. 9 is a time chart showing transitions of the engine rotational speed and the fluctuation degree of the engine rotational speed after the fuel injection according to the embodiment.

Due to the injection, the transition of the engine rotational speed NE after the timing t23a is shown not by a graph as of the non-injection shown in FIG. 8 (i.e., graph shown by a chain double-dashed line L22 in FIG. 9) but by a graph shown by a solid line L21 in FIG. 9, that is, a graph reflecting the influence of the injection. In this example, the engine rotational speeds NE (t21), NE (t22), NE (t23), NE (t24) at the timings t21, t22, t23, t24 are obtained in accordance with the graph shown by the solid line L21 in FIG. 9. In the present embodiment, the fluctuation parameter ΔNE in the 720° CA cycle is calculated in accordance with a following expression (Formula 1) based upon the obtained engine rotational speed NE at each time.

$$\Delta NE = \Delta NE2a - \Delta NE2 \approx [(\Delta NE1 + \Delta NE3)/2] - \Delta NE2 \quad \text{(Formula 1)}$$

In Formula 1, the fluctuation degrees ΔNE1, ΔNE2, ΔNE2a, ΔNE3 of the engine rotational speed NE are defined by the engine rotational speed NE'(t23) and the above-described engine rotational speeds NE(t21)-NE(t24) according to the following expression (Formula 2).

$$\Delta NE1 = NE(t21) - NE(t22),$$

$$\Delta NE2 = NE(t22) - NE(t23), \quad \text{(Formula 2)}$$

$$\Delta NE2a = NE(t22) - NE'(t23),$$

$$\Delta NE3 = NE(t23) - NE(t24)$$

The engine rotational speed NE'(t23) corresponds to the engine rotational speed NE at the timing t23 in the case of the non-injection (shown by chain double-dashed line L22) and is set virtually for approximately calculating the fluctuation parameter ΔNE.

As shown by Formula 1, in the present embodiment, the fluctuation parameter ΔNE due to the injection performed at S33 of FIG. 4 (all injections included in the injection pattern) is calculated as the difference (NE(t23)−NE'(t23)) between the actual engine rotational speed NE(t23) (shown by solid line L21) at the rotational speed detection timing t23 immediately after the injection and the engine rotational speed NE'(t23) in the case of the non-injection (shown by chain double-dashed line L22). Since the virtually set engine rotational speed NE'(t23) can not be directly detected, the engine rotational speed NE'(t23) is approximately calculated (estimated) by using the fluctuation degree ΔNE1 of the engine rotational speed NE in the combustion cycle before the injection and the fluctuation degree ΔNE3 of the engine rotational speed NE in the combustion cycle after the injection (as shown by Formula 1).

In the present embodiment, the thus-obtained fluctuation parameter ΔNE is converted into an energy equivalent according to Formula 3 to obtain the fluctuation parameter as an energy value (fluctuation parameter ΔE).

$$\Delta E = I\ddot{\theta} = I \times (\Delta NE / \Delta t) \quad \text{(Formula 3)}$$

In Formula 3, I denotes an inertia moment and is basically defined by a design value of the engine 10 (particularly, flywheel or the like) ΔNE/Δt corresponds to a value obtained by second order differential of an angular velocity θ (engine rotational speed NE) as of the injection. Δt corresponds to the time from injection timing t23a to the rotational speed detection timing t23 immediately after the injection. Accordingly, in this example, the time Δt is obtained as the time necessary for the crankshaft 15 to rotate by 180° CA from the TDC of the first cylinder #1 to the TDC of the third cylinder #3. That is, the time Δt can be expressed by following Formula 4 by using the engine rotational speed NE as of the injection.

$$\Delta t = (180/360)/NE = 1/(2NE) \quad \text{(Formula 4)}$$

Thus, in the present embodiment, the engine rotational speed NE at each time is detected in the 720° CA cycle. At S33 of FIG. 4, the injection is performed in the mode of each of FIGS. 5 and 6 and at following S34, the fluctuation parameter of each injection pattern shown in each of FIGS. 5 and 6 is calculated. On the occasion of the calculation of the fluctuation parameter, first, by using Formula 1, the fluctuation parameter ΔNE is obtained based upon the fluctuation degrees ΔNE1 to ΔNE3 of the engine rotational speed NE at each time detected in the cycle of 720° CA. Next, by using Formula 3, the fluctuation parameter ΔNE is converted into the energy equivalent to obtain the fluctuation parameter ΔE as the energy value.

At S341, a sum of the fluctuation degrees (fluctuation parameter ΔE) of the engine operating condition due to all the injections (one injection in the case of the data number 1, and two injections in the case of the data number 2) is repeatedly obtained for each injection pattern (data number 1 or 2). For each injection pattern, the fluctuation parameters ΔE of the number of the threshold values SH presented in FIG. 4 (for example, 10 pieces of the fluctuation parameters ΔE) are stored in the EEPROM 66 together with the data number N (1 or 2). The fluctuation parameters ΔE are obtained for each of the cylinders #1 to #4 and are managed individually (to be distinguishable) for each cylinder (cylinder number). More specifically, for example, the fluctuation parameters ΔE are classified and stored in memory regions (for example, plural memory devices or plural regions in a single memory device) prepared for the respective cylinder numbers so that each data is managed to be distinguishable.

Figure 10:
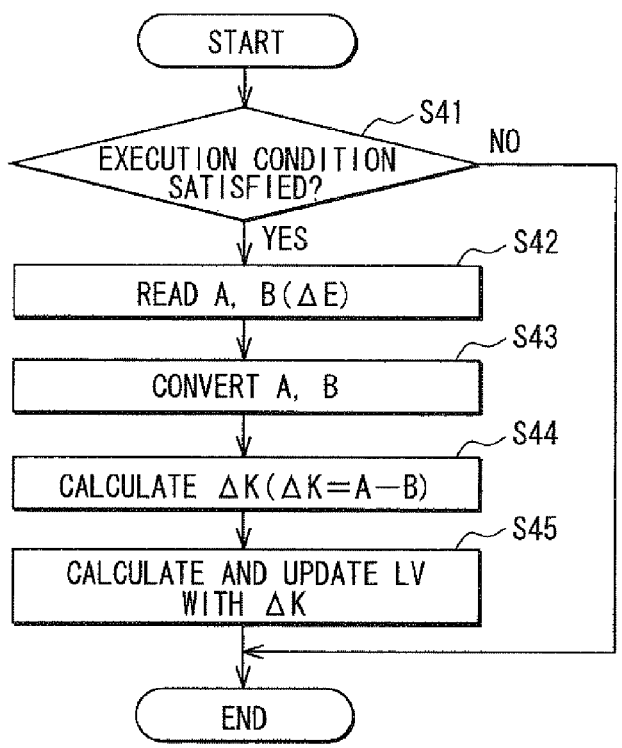
FIG. 10 is a flowchart showing a mode of the correction processing according to the embodiment.
Figure 11:
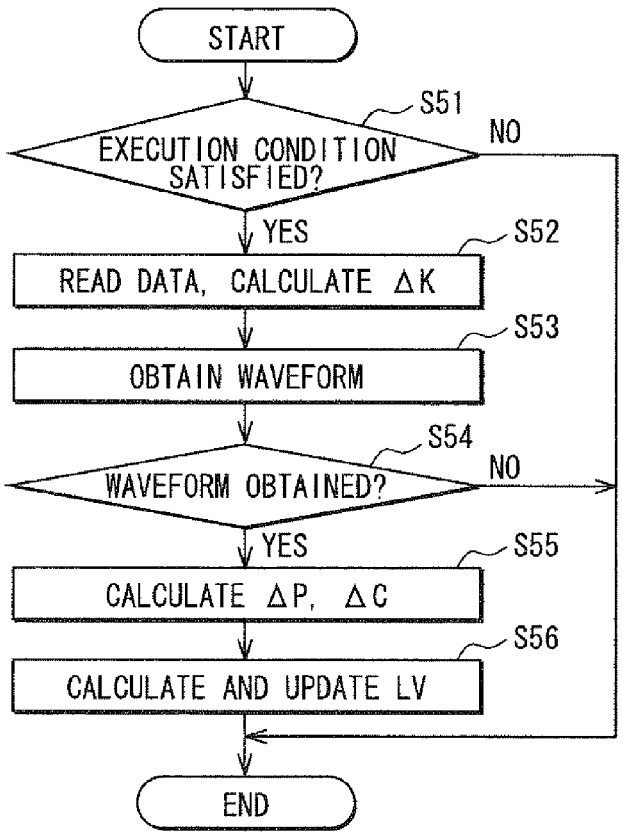
FIG. 11 is a flowchart showing another mode of the correction processing according to the embodiment.

Next, two kinds of the correction processing will be explained by mainly referring to FIGS. 10 to 12. FIGS. 10 and 11 are flowcharts each showing process steps of the correction processing. Also in each processing, as in the case of the processing of FIG. 4, first, it is determined whether or not an execution condition concerning the correction processing (correction execution condition) is satisfied. Only when the execution condition is satisfied, a series of processes shown in each figure is executed.

First, a mode of the correction processing (correction I) will be explained in detail by referring to FIG. 10. As shown in FIG. 10, in a series of processes, first at S41, it is determined whether or not the aforementioned execution condition is satisfied. When S41 is YES, the process goes to S42. This execution condition may be arbitrarily set. Here, the execution condition is that the data used for the correction (i.e. for updating of the correction coefficient) such as the fluctuation parameters ΔE (hereinafter, referred to as data A and data B) of the injection patterns corresponding to the data numbers 1, 2 (equivalent to first injection unit and second injection unit) are stored in the EEPROM 66. Accordingly, in the present embodiment, the correction processing of S42 and subsequent steps after S41 is executed if the data A, B are stored in the EEPROM 66.

In the correction processing, first, at S42, the data A, B (fluctuation parameters ΔE) are read from the EEPROM 66. In the present embodiment, each data are obtained to the number equal to the threshold value SH (FIG. 4). Therefore, an average value of each of the data A, B is obtained as a final value. For example, when ten data A (or ten data B) are obtained, a sum of the ten data A (or ten data B) is divided by ten to obtain the average value.

At following S43, each of the final single data A, B is converted into a value per a predetermined unit injection number (unit injection stage number). For example, in the case of setting the unit injection number at one, the data A corresponding to the single stage injection (shown in FIG. 5) is kept as it is, and the data B corresponding to the multiple injection of two stages (shown in FIG. 6) is multiplied by ½ to obtain the fluctuation parameter ΔE per one time (one stage).

At following S44, the data A, B converted at S43 are compared to obtain the deviation degree of the both values. More specially, the difference between the both values is calculated to obtain a deviation degree ΔK (=A−B). At following S45, the correction coefficient used at S14 of FIG. 2 is updated based upon the deviation degree ΔK obtained at S44.

For example, the correction coefficient of the injection pattern (the multiple injection of the two stages) corresponding to the data number 2 is updated (changed) to conform the data B (data number 2) to the data A (data number 1) on a basis of the data A (data number 1). More specially, the deviation degree ΔK is basically proportional to a deviation degree ΔQ in the injection quantity between the injection patterns of the data number 1 and the data number 2 (ΔK∝ΔQ). Therefore, on the occasion of updating the correction coefficient, in order to compensate the deviation in the injection quantity between the injection patterns (deviation degree ΔQ), the injection quantity is corrected (increased or decreased) by, for example, changing the correction coefficient concerning the injection period (equivalent to energization period of the injector 19). Thus, the targeted engine operating condition can be obtained through the multiple injection with high accuracy.

The above-described correction example is only one of examples The object to be corrected is not limited to the injection period (energization period). For example, the injection quantity can be also changed by the injection start timing or the injection end timing. When the injection end timing is constant, the injection quantity can be changed by changing the injection start timing. When the injection start timing is constant, the injection quantity can be changed by changing the injection end timing. The injection timing (start/end), the injection period, the injection interval and the like may be corrected to compensate the influence (surge characteristic) of the former stage injection shown in FIG. 6. Also in such the manner, the engine operating condition can be approximated to the target sttate (i.e., accuracy in control can be improved).

Next, a more detailed example of the correction mode (in detail, updating mode of the correction coefficient) by the processing in FIG. 10 will be explained by referring to FIGS. 5 and 6. In this example, first, the injection pattern of the data number 1 is corrected with respect to a certain reference value, and then, the injection pattern of the data number 2 is corrected with respect to the corrected injection pattern.

First, a mode of the correction concerning the injection pattern of the data number 1 will be explained by referring to FIG. 5. As shown in FIG. 5, if the injection in the injection pattern corresponding to the data number 1 is performed, the fluctuation degree ΔNE of the engine rotational speed NE occurs as shown by the solid line L4 with respect to the engine rotational speed NE (shown by the broken line L4a in FIG. 5) that has been stable during the decelerating operation. The fluctuation degree ΔNE of the engine rotational speed NE is detected and calculated according to formula 1 and formula 3 and is finally obtained as the fluctuation parameter ΔE, which is the energy value. In the correction processing shown in FIG. 10, the fluctuation parameter ΔE (data B) is read out from the EEPROM 66 at S42. In addition, a certain reference value (data A) as shown by a dashed line L4b in FIG. 5 is also read out from, for example, the ROM 64. A predetermined value (adapted value) beforehand determined from, for example, experiments or the like may be used as the reference value (data A).

At S44, as shown in FIG. 5, a difference between the data A and the data B is calculated and is defined as a deviation degree $\Delta K1$ between both the data ($\Delta K1=A-B$). At S45 the correction coefficient LV of the injection pattern concerning the data number 1 is updated based upon the deviation degree $\Delta K1$. In detail, in order to compensate the deviation degree $\Delta K1$ with respect to the reference value (data A), for example, the injection period from the timing t1 to the timing t2 is corrected to the injection period from the timing t1 to timing t2a as shown by a broken line L1a in FIG. 5. In consequence, the injection rate characteristic R and eventually the injection quantity can be increased as shown by a broken line L2a in FIG. 5. A region R1a in FIG. 5 shows an increase of the injection quantity due to the correction.

Next, by referring to FIG. 6, a mode of correction concerning the injection pattern of the data number 2 will be explained. As described before, the correction is performed with respect to the corrected injection pattern in the data number 1. That is, the injections in the injection pattern concerning the data number 2 are performed after the correction of the injection pattern of the data number 1. In this case, at S42 in FIG. 10, the fluctuation parameter $\Delta E$ (data B) due to the former stage injection and the latter stage injection shown in FIG. 6 is read out from the EEPROM 66. In addition, here, the data after the correction of the injection pattern of the data number 1 (i.e., fluctuation parameter $\Delta E$ corresponding to correction coefficient) is used as the data A, which is a reference of the correction. The data (data A) after the correction corresponds to a fluctuation parameter $\Delta NE$ (converted into a fluctuation parameter $\Delta E$) shown by a dashed line L14b in FIG. 6.

At following S43, the data A and the data B as average values respectively are converted into the values per a certain unit injection time number. Here, two times is used as the unit injection time number. As for the data A concerning the single stage injection, the data A is multiplied by two to obtain the fluctuation parameter $\Delta E$ per two times of the injections. In consequence, the data A becomes a value corresponding to the fluctuation parameter $\Delta NE$ shown by a dashed line L14c in FIG. 6. The data B concerning the multiple injection as the two stage injection is kept as it is.

At S44, as shown in FIG. 6, a difference between the data A and the data B is calculated and is defined as a deviation degree $\Delta K2$ between both the data ($\Delta K2=A-B$). At S45, the correction coefficient LV of the injection pattern concerning the data number 2 is updated based upon the deviation degree $\Delta K2$. In detail, in order to compensate the deviation degree $\Delta K2$ with respect to the data (data A) concerning the injection pattern of the data number 1 for example, the injection period from the timing t14 to the timing t15 is corrected to an injection period from the timing t14 to timing t15a as shown by a broken line L11a in FIG. 6. In consequence, the injection rate characteristic R and eventually the injection quantity can be increased as shown by a broken line L12a in FIG. 6. A region R12a in FIG. 6 shows an increase quantity of the injection quantity due to the correction.

As described above, in this example, after the correction of the injection pattern of the data number 1, the fluctuation parameters $\Delta E$ (data A, B) of the injection pattern of the corrected data number 1 and the injection pattern of uncorrected data number 2 are obtained. Then, the data B (multiple injection) is corrected based upon the corrected data A (single stage injection). According to this scheme, the relative correction of the data B is performed based upon the corrected data A containing a small error with respect to a true value. Therefore, in regard to the data B also, an error with respect to a true value (absolute deviation degree) is indirectly compensated. Likewise, another injection pattern (for example, three stage injection as a multiple injection) can be corrected based upon the injection pattern concerning the corrected data number (for example, data number 2). Thus, accurate correction can be sequentially performed based upon the corrected injection pattern one after another. Particularly, if the correction is performed in the order of the single stage, the two stages, the three stages and further stages, the correction of the multiple injection having a large number of injection stages (correction of an injection characteristic) can be performed accurately and efficiently.

Next, by referring to FIGS. 11 and 12, another mode of the correction processing (correction II) will be described in detail. As shown in FIG. 11, in a series of processes, first at S51, it is determined whether or not the aforementioned execution condition is satisfied. When S51 is YES, the process goes to S52. The process at S51 is similar to the process at S41 in FIG. 10. Here, the execution condition is satisfied when multiple kinds of injection patterns, which are different from the injection pattern of the data number 2 only in the injection interval IBL, i.e., which are different from each other only in the injection interval IBL, are obtained to a certain number (for example, 18 pieces as shown in FIGS. 12A to 12C) in addition to the injection patterns of the data number 1 and the data number 2. These injection patterns are obtained as the data numbers 3, 4, 5, etc. to follow the data numbers 1, 2 by the processing (learning processing) in FIG. 4 like the injection patterns of the data number 1 and the data number 2 and are stored in the EEPROM 66.

At S52, through processes similar to the processes at S42 to S44 of FIG. 10, the fluctuation parameters $\Delta E$ due to the injection patterns of the data numbers 1, 2 (corresponding to a first injection unit and a second injection unit) are read out as the data A, B. Then, arbitrary conversion processing as processing before comparison is applied to the fluctuation parameters $\Delta E$. Then, the deviation degree $\Delta K$ concerning the converted values (the converted values of the fluctuation parameters $\Delta E$) is calculated and obtained. At following S53, a waveform (waveform information) showing a relation between the deviation degree $\Delta K$ obtained at S52 and the injection interval of the second injection unit is obtained based upon the deviation degree $\Delta K$ (all of the deviation degrees $\Delta K$ when there are a plurality of them). At following S54, it is determined whether or not the aimed waveform information is obtained by the process at S53.

When S54 is NO, a series of the processes in FIG. 11 ends once. Thereafter, if the correction execution condition is still satisfied, once more via the processes of S51 to S53, the deviation degree $\Delta K$ is obtained (at S52) and further, the waveform (waveform information) is calculated (at S53) in series. At S52, the injection pattern (first injection unit) concerning the data number 1 is combined with the injection patterns (second injection unit) of the data numbers 2, 3, 4, 5, etc. that are different from each other only in the injection interval IBL. For example, a combination of the data numbers 1, 3 is made in the second time, a combination of the data numbers 1, 4 is made in the third time and a combination of the data numbers 1, 5 is made in the fourth time. Then, the deviation degree $\Delta K$ of the fluctuation parameters $\Delta E$ (conversion value) is obtained for each combination in series. Thus, until it is determined that S54 is YES (i.e., the aimed waveform information is obtained), the processes at S51 to S53 are repeatedly executed. When S54 is YES (i.e., the aimed waveform information is obtained), at following S55, a phase deviation and a cycle deviation from a predetermined reference waveform are calculated based upon the waveform information.

An example of the processing concerning obtainment and calculation of the waveform (waveform information) (S53 to S55) will be described by referring to FIGS. 12A to 12C. FIGS. 12A to 12C are time charts each showing a relation between the fluctuation parameter ΔE (longitudinal axis) and the injection interval IBL (lateral axis) concerning the second injection unit (injection patterns of the data numbers 2, 3, 4, 5, etc.) The lateral axis shows the boundary of ΔK=0. The side above the boundary (ΔK=0) corresponds to positive deviations and the side below the boundary (ΔK=0) corresponds to negative deviations. In each of FIGS. 12A to 12C, a waveform shown by a dashed line L30 is a certain waveform (reference waveform) as a reference of a change mode of the fluctuation degree (a sum of fluctuation degrees due to former stage injection and latter stage injection) of the engine operating condition corresponding to the injection interval. The reference waveform is beforehand stored in an arbitrary memory device such as the ROM 64 or the EEPROM 66.

In this example, as shown in FIG. 12A, a plurality of kinds of injection intervals IBL of the second injection unit (each of injection patterns concerning the data numbers 2, 3, 4, 5, etc.) read out at S52 are set at certain portions in a concentrated manner. In more detail, the injection intervals IBL contain only injection intervals corresponding to portions (positive-side peak portion P1, negative-side peak portion P2 and node portion P3) showing regularity of the reference waveform (dashed line L30). Such the data can be obtained by beforehand writing such injection patterns in the table used at S32 in FIG. 4, for example.

At S53 in a series of processes shown in FIG. 11, a waveform showing a relation between the deviation degree ΔK, which is obtained by comparing the fluctuation parameter ΔE of the first injection unit (injection pattern concerning the data number 1) and each fluctuation parameter ΔE of the second injection unit (each of injection patterns concerning the data numbers 2, 3, 4, 5, etc.), and the injection interval IBL of the second injection unit is calculated based upon each deviation degree ΔK. At following S54, it is determined whether or not the aimed waveform information (i.e., measured waveform) necessary for calculating the phase deviation and the cycle deviation between the measured waveform and the reference waveform is obtained by the process at S53. The measured waveform (waveform information) shows an injection characteristic of the fuel supply system (particularly, injector 19) in the system (FIG. 1) at each time, including the aging characteristic change. At following S55, the phase deviation ΔP and the cycle deviation ΔC between the measured waveform and the reference waveform are calculated based upon the waveform information obtained At S54.

For example, on the occasion of obtaining the phase deviation ΔP, the phase deviation ΔP of the measured waveform from the reference waveform is obtained based upon the deviation degree ΔK. That is, positions (injection intervals) of positive-side peaks P1a, P1b of the measured waveform are detected as points where the deviation degree ΔK is maximized. Positions (injection intervals) of negative-side peaks P2a, P2b of the measured waveform are detected as points where the deviation degree ΔK is minimized. In addition, positions (injection intervals) of nodes P3a, P3b of the measured waveform are detected as points where the deviation degree ΔK is zero. Then, each position (each injection interval) of the positive-side peaks P1a, P1b, the negative-side peaks P2a, P2b and the nodes P3a, P3b is compared with each corresponding position of the reference waveform (for example, the difference is calculated). Through the comparison, the phase deviation ΔP of the measured waveform from the reference waveform is obtained. A relation between the measured waveform and the reference waveform (dashed line L30) in the case where the phase deviation between waveforms occurs is shown in FIG. 12B.

On the occasion of obtaining the cycle deviation ΔC, the cycle deviation ΔC of the measured waveform from the reference waveform is obtained based upon the deviation degree ΔK. For example, an interval T33 between the nodes P3a, P3b is obtained based upon positions (i.e., injection intervals IBL) of the detected nodes P3a, P3b. Likewise, an interval T31 between the positive-side peaks P1a, P1b, and an interval T32 between the negative-side peaks P2a, P2b are obtained. Each of the intervals T31, T32, T33 corresponds to a cycle of the measured waveform. Therefore, each of the intervals T31, T32, T33 (or an average value of the intervals) is compared with each corresponding cycle of the reference waveform (or the corresponding average value) (for example, a difference is calculated). Through the comparison, the cycle deviation ΔC of the measured waveform from the reference waveform is obtained. A relation between the measured waveform and the reference waveform (dashed line L30) in the case where cycle deviation occurs between the waveforms is shown in FIG. 12C, for example.

In this correction example (correction II), the phase deviation ΔP and the cycle deviation ΔC between the measured waveform and the reference waveform are respectively calculated and obtained in the above described modes. As shown in FIG. 11, at S56 following S55, the correction coefficient LV used at S14 in FIG. 2 is updated based upon the phase deviation ΔP and the cycle deviation ΔC.

For example, in order to compensate the phase deviation ΔP and the cycle deviation ΔC, the correction coefficient concerning at least one of the injection start timing t14, the injection end timing t15 and the injection interval IBL of each of the injection patterns (two stage injection as the multiple injection, e.g., shown in FIG. 6) of the data numbers 2, 3, 4, 5, etc. is updated. In consequence, the target engine operating condition can be obtained with high accuracy through the multiple injection.

This correction example is one of the examples, and the object of the compensation or the correction herein is not limited to the above-described parameters. For example, a correction coefficient concerning the above-described injection parameter or other parameters such as the injection period may be updated (corrected) to compensate an amplitude deviation of the measured waveform from the reference waveform based upon at least one of the positive peak position and negative peak position of the measured waveform detected at S55. Thus, the engine operating condition can be approximated to the target condition (i.e., control accuracy is improved).

Thus, in the present embodiment, the injection characteristic (fluctuation parameter ΔE) at each time including the aging characteristic change is learned by the learning processing shown in FIGS. 3 and 4 in series. In addition, at least one of two kinds of correction processing (correction I and correction II) shown in FIGS. 10 and 11 is executed. Thus, the certain correction coefficient is updated based upon the learned value (injection characteristic) and at the same time, the correction concerning the fuel injection is performed by using the correction coefficient at S13 and S14 of FIG. 2. That is, in the present embodiment, it is possible to obtain the correction coefficient at each time as the injection characteristic at each time concerning the fuel supply system by the fuel injection controller and the diagnosis method of the fuel supply system. In addition, it is possible to more accurately correct a control error due to the aforementioned individual difference, the aging change or the like by using the correction coefficient.

As described above, the fuel injection controller and the diagnosis method of the fuel supply system according to the present embodiment can achieve following excellent effects, for example.

(1) The fuel injection controller (housed in ECU 50 for engine control) for controlling the injection operation of the fuel injection valve (injector 19) is provided with the following programs. One (injection execution device, S32 and S33 in FIG. 4) is to execute injections of plural kinds of injection patterns including an injection pattern of the multiple injection to a certain cylinder during non-injection operation. The other (fluctuation degree obtaining device, S34 in FIG. 4, S42 in FIG. 10 and S52 in FIG. 11) is to obtain a sum (fluctuation parameter $\Delta E$) of fluctuation degrees of an engine operating condition due to all the injections (one injection by one stage injection pattern in the case of the first injection unit and two injections by two-stage injection pattern in the case of the second injection unit) concerning each of the first injection unit composed of one of the plural patterns (for example, single stage injection shown in FIG. 5) and a second injection unit composed of another one of the plural patterns (for example, multiple injection shown in FIG. 6) executed by the above program together with the injection condition (cylinder number and data number N).

Thus, the fluctuation parameter $\Delta E$ is obtained with the injection condition (the first and second injection units have the same condition except for the injection pattern). Eventually, the injection characteristic at each time can be obtained. In addition, with the injection characteristic at each time, the data analysis through data accumulation, the correction of the injection characteristic, failure diagnosis of the fuel supply system including the injector 19 and the like can be performed easily and accurately.

(2) There is provided a program (S35 and S36 in FIG. 4, S42 in FIG. 10 and S52 in FIG. 11) that obtains plural pieces (threshold value SH in FIG. 4) of fluctuation parameters $\Delta E$ in a state where the injection execution condition (refer to S21 in FIG. 3) and the injection pattern (first and second injection units) are respectively the same and obtains the average value of the fluctuation parameters $\Delta E$ as the final fluctuation parameter $\Delta E$. Thus, an error due to a variation in the injection condition or the like at each time can be reduced, and as a result, the fluctuation parameter $\Delta E$ can be obtained with more accuracy.

(3) There is provided a program for converting the fluctuation parameter $\Delta E$ concerning each injection unit obtained by the process at S34 in FIG. 4 to be suitable for a predetermined comparison condition. In detail, the fluctuation parameter $\Delta E$ obtained at S34 is converted to the value per a certain unit injection time number (for example, one time) (conversion device, S43 in FIG. 10 and S52 in FIG. 11). In consequence, the converted value suitable for the certain comparison condition concerning each injection unit (converted value of the fluctuation parameter $\Delta E$) can be automatically obtained and eventually, the comparison of the aforementioned fluctuation parameter $\Delta E$ is facilitated.

(4) There is provided a program that compares the converted values converted at S43 in FIG. 10 or S52 in FIG. 11 to obtain the deviation degree $\Delta K$ between both the converted values (injection deviation obtaining device, at S44 in FIG. 10 and S52 in FIG. 11). Thus, it is possible to obtain the deviation degree $\Delta K$ of the fluctuation parameter $\Delta E$ concerning one of the compared injection units based upon the other. In addition, it is possible to detect the injection characteristic at each time (particularly, injection characteristic of the multiple injection) based upon the deviation degree $\Delta K$ between the converted values. Further, in the above scheme, the comparison can be automatically performed through the program of the comparison.

(5) There is provided a program that detects the injection characteristic defined by the injector 19 based upon the deviation degree $\Delta K$ obtained at S44 in FIG. 10 or S52 in FIG. 11. In detail, the program obtains the deviation degree $\Delta K$ showing the injection characteristic and the correction coefficient (injection characteristic detection device, at S44 and S45 in FIG. 10 and S52 and S56 in FIG. 11). In consequence, obtainment of the injection characteristic at each time is automatically performed and eventually, the injection characteristic at each time is easily obtained.

(6) There is provided a program for correcting the injection of the injector 19 based upon the deviation degree $\Delta K$ obtained at S44 in FIG. 10 or S52 in FIG. 11 (injection characteristic correction device, S45 in FIG. 10, S56 in FIG. 11, further, S13 and S14 in FIG. 2 and the like). In consequence, correction of the fuel injection based upon the injection characteristic at each time is automatically performed and eventually, the target engine operating condition can be obtained more accurately through the multiple injection.

(7) There is shown an example of the program for correcting parameters concerning the injection quantity of the injection performed with the injector 19 (for example, the injection start timing, the injection end timing and the injection period) on the occasion of the correction (specifically, on the occasion of updating of the correction coefficient) at S45 in FIG. 10 or S56 in FIG. 11. Since the fluctuation parameter $\Delta E$ basically has a correlation with a total injection quantity of all the injections, this scheme enables accurate compensation of the control error with respect to the target engine operating condition (i.e., approximation of the actual engine operating condition to the target value).

(8) In particular when the injection period is used as the parameter of the injection quantity, the injection period can be easily corrected (changed) by changing the energization period of the injector 19.

(9) There is shown an example of the program for correcting the injection interval concerning the injection pattern of the multiple injection on the occasion of the correction (specifically, on the occasion of update of a correction coefficient) at S45 in FIG. 10 or S56 in FIG. 11. According to this scheme, the influence (surge characteristic) by the former stage injection shown in FIG. 6 can be compensated and eventually, the control error with respect to the target engine operating condition can be accurately compensated (i.e., the actual engine operating condition can be approximated to the target value).

(10) There is provided an EEPROM 66 (correction coefficient holding device) capable of holding the correction coefficient in the nonvolatile state to store the correction coefficient concerning the correction. With this construction, for example, after the engine 10 is stopped (for example, an ignition switch is turned off) and the power supply to the device (ECU 50) is shut off, the data (learned value of the correction coefficient) is held in the nonvolatile state. In consequence, at the next engine start time, the correction can be performed based upon the data as of the previous engine start time.

(11) The execution condition (determined at S21 in FIG. 3) of the injection at S32 and S33 in FIG. 4 adopts, as the satisfaction requirement of the execution consition, all conditions that the injection pressure is within the predetermined range, that the rotational speed of the engine 10 is within the predetermined range and that the engine 10 is decelerating (S21 in FIG. 3). In consequence, the injection conditions at each time concerning the above-described conditions can be equalized.

(12) Particularly, in the case of adopting the condition that the engine 10 is decelerating as the execution condition of the injection, it is possible to perform the injection in the state where the engine 10 is stable and eventually, the fluctuation parameter ΔE or the like can be detected with high sensitivity.

(13) At S34 in FIG. 4, the fluctuation parameter ΔE is obtained for each of the first injection unit of a certain injection pattern (for example, single stage injection shown in FIG. 5) and the second injection unit of an injection pattern defined by adding an injection to the injection pattern of the first injection unit (for example, multiple injection shown in FIG. 6). In addition, the fluctuation parameters ΔE of the first and second injection units are compared at S44 in FIG. 10 or S52 in FIG. 11 and thereby, the deviation degree ΔK between them is obtained Accordingly, a different portion in the injection pattern between the first and second injection units becomes apparent to facilitate comparison of them. In addition, by the comparison, it is possible to obtain the injection characteristic concerning the injection as the different portion (for example, latter stage injection in the multiple injection shown in FIG. 6) more accurately.

(14) At S34 in FIG. 4, the fluctuation parameter ΔE is obtained for the combination of the first injection unit of the certain injection pattern (for example, single stage injection shown in FIG. 5) and each of plural second injection units of the injection patterns (for example, multiple injection shown in FIG. 6) that are different from the injection pattern of the first injection unit only in a specific parameter (injection stage number). Such a scheme enables accurate obtainment of the injection characteristic in accordance with the difference in the specific parameter (injection stage number).

(15) The multiple injection pattern (for example, multiple injection shown in FIG. 6) including the injection that is performed at the injection timing near the TDC (top dead center) as the second or later stage injection (for example, the latter stage injection of the multiple injection shown in FIG. 6) is included in the plural kinds of injection patterns (corresponding to one of the first and second injection units) set in the table used at S32 in FIG. 4. According to such the multiple injection pattern, the fluctuation parameter ΔE of the second or later stage injection, which is important for detecting the injection characteristic of the multiple injection, can be obtained with high sensibility. Moreover, since the second or later stage injection is defined as the final stage injection, the injection characteristic of the multiple injection can be obtained more accurately.

(16) At least one injection pattern, in which the injection periods of all the injections are short (for example, the injection pattern shown in FIG. 5 or 6), is included as the first or second injection units among the plural kinds of the injection patterns set in the table used in S32 in FIG. 4 (corresponding to one of the first and second injection units). By defining the injection period (injection quantity) of each of all injections as the small value, the fluctuation parameter (a sum of fluctuation degrees) can be obtained while restricting deterioration of drivability.

(17) The injection pattern (for example, injection pattern including a sub-injection of two or more stages) corresponding to (equal to or similar to) the injection pattern (control map) used for the control during the normal operation of the engine 10 is contained in the table used at S32 in FIG. 4. As a result, it is possible to improve the controllability in injection control during the normal operation of the engine 10 through the correction of the injection characteristic or the like.

(18) At least one injection pattern (for example, injection pattern shown in FIG. 5 or 6) of performing all the injections in the pattern during one combustion cycle (for example, a period of 720° CA) is included as the first or second injection unit among plural kinds of injection patterns set in the table used in S32 in FIG. 4 (corresponding to one of the first and second injection units). In particular, the present embodiment assumes that each of all the patterns in the table performs all the injections during one combustion cycle. By performing the above-described correction concerning such the injection patterns, the engine control can be performed with high accuracy.

(19) At S32 and S33 in FIG. 4, at least the injection of the first injection pattern composed of the single stage injection (for example, refer to FIG. 5) is performed and thereafter the injection of the second injection pattern composed of the multiple injection (for example, refer to FIG. 6) with the stage number (for example, two stages) different from that of the first injection pattern is performed. At S34 in FIG. 4, the fluctuation parameter ΔE is obtained for each of the first and second injection units. With this scheme, each of the first and second injection units is limited to one injection pattern. Therefore, the converted value of the fluctuation parameter ΔE per unit injection number concerning each injection unit can be obtained through simple control.

(20) In particular, by setting the first and second injection patterns as a combination of the single stage injection pattern and the two stage injection pattern as the multiple injection pattern, the injection characteristic of the aforementioned multiple injection can be obtained more easily and accurately.

(21) There is shown an example provided with the program (pre-obtainment correction device) that performs the injection correction concerning one of the first and second injection units (for example, single stage injection shown in FIG. 5) before obtaining the fluctuation parameter ΔE (S42 in FIG. 10 and S52 in FIG. 11). With this scheme, a relative deviation degree of the other uncorrected injection unit can be obtained from the corrected injection unit and thereby, an absolute deviation degree can be also indirectly obtained.

(22) In the above-described example, the program for performing the correction before obtaining the fluctuation parameter ΔE is defined as the program (reference correction device) to beforehand perform the injection correction with respect to a certain reference value (for example, adapted value). Thus, the absolute fluctuation degree can be easily corrected.

(23) One of the injection units corrected with respect to the reference value is composed of the injection pattern of the single stage injection. In this way, the correction or the like of the injection characteristic of the multiple injection can be performed based upon the corrected injection characteristic of the single stage injection.

(24) There is shown an example provided with the program (relative correction device) for performing the injection correction concerning the uncorrected injection unit (for example, multiple injection shown in FIG. 6) by using the injection unit (for example, single stage injection shown in FIG. 5) corrected with respect to the reference value as the reference based upon the deviation degree ΔK obtained at S44 in FIG. 10. With this scheme, the correction on the basis of the corrected injection unit is automatically applied to the other uncorrected injection unit, making it possible to indirectly correct an absolute deviation degree concerning the other uncorrected injection unit.

(25) There is further shown an example provided with the program (continuous correction device) that further performs the injection correction concerning yet another injection pattern (injection unit) based upon the injection pattern (injection unit) corrected by the above-described program (relative correction device). In this way, the corrected injection pattern is sequentially used as a reference to continuously perform the accurate correction.

(26) By performing the correction in the order of the first stage, the second stage, the third stage and further stages, the correction of the multiple injections of large injection stage numbers can be performed more accurately and efficiently.

(27) At S32 and S33 in FIG. 4, injections of two kinds of the multiple injection patterns different from each other at least in the injection interval are performed in a certain order. At S34 in FIG. 4, the fluctuation parameter ΔE is obtained for each of the first and second injection units corresponding to the two kinds of patterns different from each other in the injection interval. With this scheme, the injection characteristic of the multiple injection concerning the injection interval can be obtained relatively easily and accurately.

(28) At S52 in FIG. 11, one injection unit (first injection unit) composed of a certain injection pattern (for example, single stage injection shown in FIG. 5) is combined with each of plural injection units (a second injection unit) composed of plural kinds of multiple injection patterns (injection patterns of the data numbers 2, 3, 4, 5, etc.) that are different from each other only in the size of the injection interval The fluctuation parameter ΔE is obtained for each combination. In this way, the injection characteristic for each value of the injection intervals can be obtained with high accuracy on the basis of the one injection unit (first injection unit).

(29) There is further provided a memory device that stores a certain waveform (reference waveform shown by the dashed line L30 in each of FIGS. 12A to 12C) concerning a change mode of the sum of fluctuation degrees of the engine operating condition corresponding to the injection interval. At least one injection interval corresponding to portions showing regularity of the reference waveform (dashed line L30) is included in the plural kinds of injection intervals of the second injection unit. In this way, the cycle and the phase of the waveform can be detected correctly, and eventually, the correction concerning the fuel injection can be accurately performed.

(30) In addition, on the occasion of the detection of the waveform, only the injection interval of the second injection unit is sequentially changed with respect to the first injection unit (injection pattern of data number 1) as the reference to sequentially obtain the fluctuation parameter ΔE of the second injection unit. This enables precise detection of the waveform.

(31) In addition, in this case, the injection intervals of the second injection unit are set in the concentrated manner in the vicinity of portions showing the regularity (positive-side peak portion P1, negative-side peak portion P2 and node portion P3 in FIGS. 12A to 12C) This enables more precise detection of the portions showing the regularity.

(32) As the portions showing the regularity, the peak portions (positive-side peak portion P1 and negative-side peak portion P2) and the node portion (node portion P3) of the reference waveform (dashed line L30 in FIGS. 12A to 12C) are used. This enables easier detection of the portions showing the regularity.

(33) There is provided a program (node detection device, S55 in FIG. 11) for detecting the positions of the nodes P3a, P3b (FIGS. 12A to 12C) of the waveform showing the relation between the injection interval of the second injection unit (injection patterns of data numbers 2, 3, 4, 5, etc.) and the fluctuation parameter ΔE due to the injection pattern of the second injection unit as the points where the deviation degree between both values of the fluctuation parameters ΔE of the respective injection units obtained at S52 in FIG. 11 becomes zero based upon the fluctuation parameters ΔE. This enables the precise detection of the portion (node portion P3) showing the regularity of the above-mentioned waveform.

(34) There is provided a program (peak detection device, S55 in FIG. 11) for detecting positions of peaks (positive-side peaks P1a, P1b and negative-side peaks P2a, P2b) of the waveform showing the relation between the injection interval of the second injection unit (injection patterns of data numbers 2, 3, 4, 5, etc.) and the fluctuation parameter ΔE due to the injection pattern of the second injection unit as the points where the deviation degree between the both values of the fluctuation parameters ΔE concerning the respective injection units obtained at S52 in FIG. 11 is maximized or minimized (maximum value in the negative side) based upon the fluctuation parameters ΔE. This enables accurate detection of the portion (positive-side peak P1 and negative-side peak P2) showing the regularity of the above-described waveform.

(35) There is provided a program (node interval obtaining device, S55 in FIG. 11) that determines the interval T33 between the nodes based upon positions of the nodes detected by the above-described program (node detection device). There is provided a program (cycle deviation obtaining device, S55 in FIG. 11) that determines the cycle deviation between the reference waveform (dashed line L30 in FIGS. 12A to 12C) and the measured waveform (waveform showing the relation between the injection interval of the second injection unit and the fluctuation parameter ΔE due to the injection pattern of the second injection unit) shown by data of the portions P1, P2, P3 in FIGS. 12A to 12C. Thus, the cycle deviation of the measured waveform from the reference waveform can be obtained.

(36) There is provided a program (peak interval obtaining device, S55 in FIG. 11) for obtaining the intervals T31, T32 between the peaks based upon the positions of the peaks detected by the above-described program (peak detection device). There is provided a program (cycle deviation obtaining device, S55 in FIG. 11) for obtaining the cycle deviation between the reference waveform and the measured waveform. In this way, the cycle deviation of the measured waveform from the reference waveform can be obtained.

(37) There is provided a program (phase deviation obtaining device, S55 in FIG. 11) for obtaining the phase deviation between the reference waveform and the measured waveform based upon the fluctuation parameters ΔE concerning the injection units obtained at S52 in FIG. 11, more specially based upon the position of the node or the peak detected based upon the fluctuation parameters ΔE. In consequence, the phase deviation of the measured waveform from the reference waveform can be obtained.

(38) There is shown one example provided with the program (injection interval correction device) for correcting the injection interval based upon the phase deviation (phase deviation concerning the injection pattern of the second injection unit) of the measured waveform obtained at S55 in FIG. 11. This enables easy and automatic correction of the phase deviation.

(39) There is shown an example provided with the program (injection start timing correction device) for correcting the injection start timing based upon the phase deviation of the measured waveform obtained at S55 in FIG. 11. This enables the correction of the movement delay of the fuel injection valve (injector 19), and eventually, the correction of the phase deviation due to the movement delay.

(40) There is shown an example provided with the program (injection end timing correction device) for correcting the injection end timing based upon the phase deviation of the measured waveform obtained at S55 in FIG. 11. This enables the correction of the movement delay of the fuel injection valve (injector 19), and eventually, the correction of the phase deviation due to the movement delay.

(41) There is provided a program (rotational speed detection device, S34 in FIG. 4) for detecting the rotational speed of the engine 10. At S34 in FIG. 4, the fluctuation parameter $\Delta E$ is obtained based upon the detected engine rotational speed. This enables easy and accurate obtainment of the fluctuation parameter $\Delta E$.

(42) At S34 in FIG. 4, by converting the detected engine rotational speed into the energy equivalent, the fluctuation parameter $\Delta E$ is obtained as the energy value. This enables inhibition of the detection variation due to the difference in the engine rotational speed.

(43) At S34 in FIG. 4, the engine rotational speed NE is detected sequentially (in 720° CA cycle) based upon at least one of the rotational speed of the crankshaft 15 as the output shaft of the engine 10 and the rotational speed of the valve operating camshaft 16 for driving the intake valve 161 (or exhaust valve) of the engine 10. According to this scheme, the engine rotational speed can be detected more easily only with the components used for general control.

(44) There is provided a program (rotational speed detection timing determining device, S34 in FIG. 4) for determining whether or not the detection timing of the engine rotational speed (corresponding to a certain integral multiple of the operation cycle of the intake valve 161 (or exhaust valve) of the engine 10) is reached based upon the rotational speed of the valve operating camshaft 16 rotating in synchronization with the movement of the intake valve 161 (or exhaust valve) of the engine 10 or the rotational speed of the crankshaft 15 linked with the valve operating camshaft 16. There is shown an example of detecting the engine rotational speed when this program determines that the detection timing of the engine rotational speed is reached. This scheme enables accurate detection of the rotational speed of the engine 10.

(45) At S34 in FIG. 4, the rotational speed of the engine 10 is sequentially detected in the cycle (720° CA cycle) corresponding to the combustion cycle, in which the combustion is performed in all the cylinders of the engine 10. This enables the inhibition of the detection error due to the variation in friction among the cylinders.

(46) Moreover, since the cycle 720° CA is a cycle corresponding to an integral multiple cycle of the rotational cycle of the crankshaft 15 or the camshaft 16 (integral multiple cycle of the operation cycle of the intake valve or the exhaust valve of the engine 10), the detection error due to a variation (difference) among intervals of pulse causing components (tooth portion 15$b$, tooth portion 16$b$ or the like) of the rotor 15$a$ or the rotor 16$a$ of each shaft is also reduced.

(47) Since the fluctuation parameter $\Delta E$ is obtained based on the engine rotational speed, the fluctuation parameter $\Delta E$ can be directly sensed, not in reference to an adaptation map or the like. Thus, the fluctuation parameter $\Delta E$ at each time reflecting the aging characteristic change can be obtained with high accuracy.

(48) At S32 to S34 in FIG. 4, the multi-cylinder engine provided with the injectors 19 disposed in the respective cylinders is used as the control object, and the injection is executed and the fluctuation parameter $\Delta E$ is obtained for each cylinder. In this way, the injection characteristic can be obtained for each cylinder (each injector) and the error of the fuel supply due to the individual difference can be compensated based upon the injection characteristic. Eventually, it is possible to realize the multi-cylinder engine capable of obtaining the desired engine operating condition with high accuracy.

(49) Whether or not the fuel supply system of the engine 10 operates normally can be diagnosed based upon the deviation degree $\Delta K$ obtained by the above-described method or the correction coefficient reflecting the deviation degree $\Delta K$ (both correspond to a degradation parameter showing a performance degradation degree of the fuel supply system of the engine 10).

The present embodiment may be modified as follows, for example.

The diagnosis of whether or not the fuel supply system of the engine 10 operates normally may be enabled more positively or may be actually performed automatically based upon the deviation degree $\Delta K$ or the correction coefficient obtained by the above-described method. For example, failsafe processing or the like may be executed based upon the magnitude of the deviation degree $\Delta K$ or the correction coefficient. For example, in a case where the correction coefficient is less than a predetermined value, as in the case of the above, the correction is performed based upon the correction coefficient. In a case where the correction coefficient is greater than the predetermined value, arbitrary warning processing such as turning-on of a warning lamp may be executed to urge a user to replace the injector 19 or the like. For example, the deviation degree $\Delta K$ or the correction efficient may be constantly (or in an arbitrary period) displayed in a visible place in a vehicle so that the user can confirm a performance degradation degree of the fuel supply system at each time. With this scheme, it is possible to early and properly detect the injection characteristic (particularly, injection characteristic of the multiple injection), correct the injection characteristic, and replace the injector 19 or the like.

In the present embodiment, plural fluctuation parameters $\Delta E$ are obtained at a stage before comparison and the final fluctuation parameter $\Delta E$ is obtained as the average value. Alternatively, for example, plural deviation degrees $\Delta K$ may be obtained by plural times of comparisons and a final deviation degree $\Delta K$ may be obtained as an average value. Also in this case, an effect similar to or corresponding to the effect (2) can be obtained.

In the scheme for calculating these average values, only the average value may be left after calculating the average value and the other data used for calculating the average value may be deleted. In a case where a storage capacity of the used memory device is limited, such the scheme is also useful.

On the occasion of the correction at S45 in FIG. 10 or at S56 in FIG. 11 (specifically, on the occasion of the update of correction efficient), the injection rate (fuel quantity injected per unit time) may be corrected as a parameter of the injection quantity. The injection rate can be varied by using a direct operating injector (for example, a direct operating piezo injector) for transmitting drive power not through a hydraulic chamber in place for the electromagnetic drive injector 19. Also in this case, an effect similar to or corresponding to the effect (7) can be obtained.

The present embodiment assumes employment of the adaptation map (S11 in FIG. 2) for beforehand defining the adapted value by experiments or the like and stores the correction coefficient for correcting the injection characteristic by the adaptation map in the EEPROM 66 capable of holding the correction coefficient in the nonvolatile state. Alternatively, for example, a value after correction (value reflecting the correction coefficient) may be stored in the EEPROM 66 in place for the correction coefficient. As an example of such the scheme, a so-called non-adaptation scheme may be adopted, which does not require the adaptation map, as long as the value after the correction is sufficiently reliable. If the correction coefficient or the value after the correction can be held in the nonvolatile state, a memory device such as another nonvolatile memory or backup RAM can be adopted as needed in place for the EEPROM. Also in this case, an effect similar to or corresponding to the effect (10) can be obtained.

The present embodiment may be constructed to include a condition concerning the transmission as the execution condition (determined at S21 in FIG. 3) of the injections at S32 and 33 in FIG. 4. Also with this scheme, an effect similar to or corresponding to the effect (11) can be obtained. In this case, disturbances applied via the drive wheels from the road can be suppressed by performing the injection on a condition that the clutch is disengaged in the MT21 (manually operated transmission) even when the injection is performed during the operation of the vehicle including the controller (particularly, during the running). In a case of detecting the injection characteristic of the injector based upon the fluctuation parameter obtained by the injection, an error due to the disturbances from a road surface is reduced and therefore, more accurate detection can be performed. For example, in a case of applying the controller of the present invention to an AT (automatic transmission) vehicle, it is effective to provide a construction that performs the injection on a condition that lockup of a torque converter (T/C) in the AT is in a disengaged state. Also in this case, an effect similar to the case of MT can be obtained. Such the condition concerning the transmission may be added to the aforementioned condition or may be used in place for the condition that the engine 10 is decelerating or the like. If the injection is performed by defining the condition concerning the transmission as the essential condition, the high detection accuracy is achieved but it becomes difficult to ensure sufficient frequency of the injection execution. Therefore, depending on its application, it is advantageous to combine the condition concerning the transmission and the above-described other conditions in parallel (i.e., as OR conditions). For example, it is also advantageous to use a condition that the engine 10 is decelerating or the clutch is in the disengagement state in the MT as one of the satisfaction requirements of the injection execution condition.

Other conditions may be also included in the execution conditions of the injection. For example, for restricting an influence of the friction or the like, it is effective to include the temperature of the engine 10 as the condition. On the other hand, it may be permitted to eliminate unnecessary conditions from the execution conditions of the injection as needed In regard to this condition, any condition may be adopted so long as at least the condition that the engine is in the process of the non-injection operation is included as one of the satisfaction conditions.

The present embodiment assumes that the execution condition of the injections in S32 and 33 in FIG. 4 (determination in S21 in FIG. 3) is fixed. Alternatively, a program (injection execution condition varying device) that variably sets the execution condition of the injection may be adopted. In this case, since the execution condition is varied, the execution condition can be varied to be applied to various applications more flexibly. By alternately performing changing of the execution condition and detection of the injection characteristic, the injection characteristic corresponding to the difference of the execution conditions (injection pressure, engine rotational speed or the like) can be easily detected. In this case, it is effective to provide a construction that stores the fluctuation parameter $\Delta E$ in an arbitrary memory device in association with the execution condition as well as the cylinder number and the injection pattern (data number N), that is, a scheme that manages each data in a distinguishable state on the occasion of reading out each data from the storage spot (memory device) in the future.

The present embodiment adopts the single stage injection shown in FIG. 5 as the first injection unit and the multiple injection of two stages shown in FIG. 6 as the second injection unit and compares the fluctuation parameters $\Delta E$ respectively caused by all the injections of the respective units. The first and second injection units are not limited to such the injection patterns but may be arbitrary as long as the injection pattern of the multiple injection is included in at least one of the first and second injection units. That is, either one or both of the first and second injection units may be constructed of a certain combination/combinations of the injection patterns.

For example, at S32 and S33 in FIG. 4, at least a first injection pattern of n stage(s) of a certain stage number composed of a single stage injection or a multiple injection, a second injection pattern of m stage(s) of a certain stage number composed of a single stage injection or a multiple injection and a third injection pattern composed of n+m stages of a multiple injection may be executed in a certain order. At following S34, a fluctuation parameter $\Delta E$ may be obtained for each of a first injection unit composed of the combination of the first and second injection patterns and a second injection unit composed of the third injection pattern. For example, concerning a one-time injection pattern (single stage injection), a three-time injection pattern (three stages multiple injection) and a four-time injection pattern (four stages multiple injection), a combination of the one-time injection pattern and the three-time injection pattern is set as the first injection unit and the four-time injection pattern is set as the second injection unit. Concerning each injection pattern, a fluctuation degree $\Delta E11$ (energy conversion value) (one-time injection pattern), a fluctuation degree $\Delta E13$ (threetime injection pattern) and a fluctuation degree $\Delta E24$ (four-time injection pattern) of the engine operation condition are obtained. The fluctuation parameter $\Delta E1$ of the first injection unit is obtained as $\Delta E11+\Delta E13$ and the fluctuation parameter $\Delta E2$ of the second injection unit is obtained as $\Delta E24$. In this way, by using the combination of certain injection patterns as one of the first injection unit and the second injection unit, it is possible to constitute a pair of the first and second injection units having the equal sums of the stage number of all the injection pattern(s) (i.e., the sum of the injection time number of the first injection unit is the same as the sum of the injection time number of the second injection unit). In addition, according to this scheme, it is possible to accurately perform the comparison without performing the conversion of the fluctuation parameters $\Delta E$ ($\Delta E1$ and $\Delta E2$ in this above example) (i.e., conversion of the injection time number) before the comparison.

In addition, the present embodiment may be constructed so that two kinds of injection patterns different from each other in a parameter other than the injection time number (for example, the injection interval IBL, the injection start timing t14, the injection end timing t15, the injection period T12, the injection rate R (solid line L12) shown in FIG. 6 or the like) are set as the first and second injection units respectively. A fluctuation parameter $\Delta E$ or a deviation degree $\Delta K$ concerning the parameter may be obtained, and further, detection or correction of the injection characteristic and the like concerning the parameter may be performed. With such the construction, it is also possible to relatively easily and accurately obtain an injection characteristic of the multiple injection.

A scheme in which the plural kinds of injection patterns set at the table used at S32 in FIG. 4 (corresponding to one of the first and second injection units) include a multiple injection pattern including a second or later injection (for example, latter stage injection of the multiple injection shown in FIG. 6) with an injection period equivalent to an invalid injection period (period as a boundary between non-injection and injection start during a normal period) is also effective. For example, in a case where an actual invalid injection period is shorter than that of the normal period and the injection quantity, which should be zero under ordinary circumstances, is shifted to a positive side, that is, in a case where the injection is performed for the injection period, which is not proper injection period for the injection under ordinary circumstances, a deviation degree of the injection period or the injection quantity is obtained based upon the above-described fluctuation parameter $\Delta E$ or the deviation degree $\Delta K$. With this scheme, the fuel quantity is controlled to be low to restrict deterioration of drivability and at the same time, at least a deviation degree in one direction (positive side in the injection quantity) of the injection characteristic concerning the injection period (eventually, injection quantity) can be accurately detected. However, in a case where the injection quantity is shifted to a negative side, fluctuation of the engine rotational speed does not occur and it is difficult to detect the deviation. Accordingly, this scheme is not suitable for an application for detecting a deviation degree in both directions of the injection characteristic concerning the injection period (eventually, injection quantity).

The present embodiment adopts all of the positive-side peak portion P1, the negative-side peak portion P2 and the node portion P3 as the portions showing the regularity of the reference waveform (dashed line L30 in FIGS. 12A to 12C), but it is sufficient only to adopt at least one of them. For example, only the node portion or only the positive-side or negative-side peak portion may be adopted to efficiently obtain the waveform information as the object with a small time number of the detection. The portion showing the regularity is not limited to these portions, but for example, a point between the positive-side peak portion P1 and the node portion P3 (for example, intermediate point) may be adopted. For the purpose of increasing detection accuracy or the like, an injection interval other than the portion showing the regularity may be included in the intervals of the second injection unit read at S52 in FIG. 11 on the occasion of obtaining the waveform (waveform information) of the injection characteristic illustrated in FIGS. 12A to 12C.

The present embodiment may be constructed so that providing a band pass filter (for example, band filter composed of a known transfer function) having a passing band corresponding to the detection timing of the engine rotational speed (S34 in FIG. 4) for the sensor output of the rotational speed sensor (crank angle sensor 41 or cam angle sensor 42), for example. Thus, the rotational speed of the engine is detected at certain timing through the band pass filter. With this structure, unnecessary noises can be eliminated to improve detection accuracy.

The present embodiment is constructed so that the rotational speed of the engine is detected in a certain rotational angle cycle by using the electromagnetic pickup type rotational speed sensor. Alternatively, for example, a linear detection type rotational speed sensor for linearly (that is, continuously) detecting a rotational position of the crankshaft may be used. For example, a resolver is known as the linear detection type rotational speed sensor.

In the present embodiment, on the occasion of obtaining the fluctuation parameter $\Delta E$, a sum of the fluctuation degrees in the engine operating condition due to all the injections in each of the first and second injection units is detected at a time. Alternatively, a fluctuation degree in the engine operating condition due to each injection (for example, each of the former stage injection and the latter stage injection of the multiple injection shown in FIG. 6) may be obtained individually and the fluctuation degrees may be added for each injection unit to obtained a sum due to all the injections. Also in this case, the fluctuation parameter corresponding to each injection unit can be obtained. As long as the sum of the fluctuation degrees of the engine operating condition due to all the injections can be obtained as the fluctuation parameter, a method (construction) of arbitrarily changing the above-described method (construction) in accordance with an application may be adopted.

The present embodiment may use a parameter other than the injection time number as a comparison condition and may include a program (conversion device) for converting the fluctuation parameter $\Delta E$ (comparison data) of each injection unit obtained by the process at S34 in FIG. 4 to be suitable for the comparison condition. For example, one of the values to be compared may be multiplied by a certain magnification ratio before the comparison to eliminate an influence other than the parameter as the comparison object. This enables more accurate comparison. For example, in a case of comparison concerning the injection period, it is effective to eliminate the influence of other parameters such as the injection interval (increasing/decreasing amount applied to the fluctuation parameter $\Delta E$).

The conversion of the fluctuation parameter $\Delta E$ before the comparison is not an essential element. In an application that does not require the conversion, the conversion can be eliminated. For example, there is a case where a fluctuation parameter $\Delta E$ before comparison is obtained without automating conversion processing or comparison processing and a user performs the conversion. Further, there is a case where as a result of a combination of the first and second injection units, comparison conditions of the fluctuation parameters $\Delta E$ coincide with each other at the time of obtainment thereof. In such the cases, the conversion can be omitted.

The present embodiment may be constructed so that, a fluctuation parameter $\Delta E$ before the comparison is obtained at S34 in FIG. 4 and a user performs the comparison without automating (for example, programming) the processes (process at S44 in FIG. 10 or S52 in FIG. 11) concerning the comparison and the obtainment of the deviation degree $\Delta K$. In this case, all the processes concerning the correction shown in FIG. 10 or FIG. 11 can be eliminated. Even with this scheme, an effect similar to the effect (1) can be achieved.

The conversion of the fluctuation degree of the engine operating condition (for example, engine rotational speed) into the energy equivalent (fluctuation parameter $\Delta E$) is not an essential condition. In a case where sufficient detection accuracy can be obtained in accordance with an application or the like, this conversion processing (conversion processing by the formula 3) may be eliminated when needed.

As the engine operating condition concerning the fluctuation parameter $\Delta E$, a combustion state (correlated with engine torque) detected by, for example, an in-cylinder pressure sensor, a knock sensor or the like may be used in addition to the aforementioned engine rotational speed. In place for the direct engine operating condition, an equivalent of the engine operating condition indirectly showing the engine operating condition, such as a quantity of a specific exhaust component (for example, NOx) detected by a proper sensor (for example, NOx sensor) or the like or a behavior of a vehicle (for example, vehicle speed) having the present engine may be used. In a case of applying the present embodiment to the present automobile control system, a scheme of providing a program (in-cylinder pressure detection device) for detecting the pressure in the cylinder through the in-cylinder pressure sensor and obtaining the fluctuation parameter ΔE at S34 in FIG. 4 based upon the pressure inside the cylinder detected by the program achieves high accuracy in torque detection and specifically effective. For obtaining the engine operating condition with high accuracy, the above-described plural parameters may be used in combination.

The present embodiment refers to a case where the present invention is applied to the common rail system of the diesel engine as one example, but the present invention may be basically applied to a spark ignition type gasoline engine (particularly, direct injection engine) in the same way.

In the above-described embodiments and the modifications, it is assumed that various types of software (programs) are used. Alternatively, similar functions may be realized by hardware such as dedicated circuits.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection controller for controlling an injection operation of an injector injecting and supplying fuel used for combustion in an engine, the fuel injection controller comprising:
    an injection execution device that executes injections of plural injection patterns including at least an injection pattern of a multiple injection into a certain cylinder of the engine in a certain order at least on a condition that the certain cylinder is performing non-injection operation before the injections, the injection pattern being defined only by parameters controllable with a control command to the injector;
    a fluctuation degree obtaining device that obtains a sum of fluctuation degrees of an engine operating condition or an equivalent thereof due to all the injections in each of at least a first injection unit composed of one or a combination of the plural patterns and a second injection unit composed of a different one or combination of the plural patterns with an injection condition; and
    an injection deviation obtaining device that compares the sums of the fluctuation degrees of the respective injection units performed in the same certain cylinder with each other and obtained by the fluctuation degree obtaining device to obtain a deviation degree between the sums, wherein
    the execution condition of the injection execution device includes a condition that injection pressure is within a predetermined range as one of satisfaction requirements thereof.

2. The fuel injection controller according to claim 1, wherein:
    the fluctuation degree obtaining device obtains a plurality of sums of the fluctuation degrees in a state where the injection execution condition is the same and the first and second injection units are the same and obtains an average of the sums of the fluctuation degrees as the sum of the fluctuation degrees.

3. The fuel injection controller according to claim 1, further comprising:
    a conversion device that converts the sum of the fluctuation degrees of each injection unit obtained by the fluctuation degree obtaining device into a form suitable for a predetermined comparison condition.

4. The fuel injection controller according to claim 3, further comprising:
    an injection deviation obtaining device that compares the converted values of the injection units converted by the conversion device to obtain a deviation degree between the converted values.

5. The fuel injection controller according to claim 1, wherein:
    the injection deviation obtaining device performs the comparison a plurality of time in a state where the injection execution condition is the same and the first and second injection units are the same to obtain a plurality of the deviation degrees between the values and obtains an average value of the deviation degrees as the deviation degree between the values.

6. The fuel injection controller according to claim 1, wherein:
    the injection deviation obtaining device combines the first injection unit composed of a certain injection pattern with each of plural second injection units composed of plural injection patterns different from each other only in a size of a specific parameter to obtain a deviation degree between the values for each combination.

7. The fuel injection controller according to claim 1, further comprising:
    an injection characteristic detection device that detects an injection characteristic of the injector based upon the deviation degree obtained by the injection deviation obtaining device.

8. The fuel injection controller according to claim 1, further comprising:
    an injection characteristic correction device that performs correction concerning the injection of the injector based upon the deviation degree obtained by the injection deviation obtaining device.

9. The fuel injection controller according to claim 8, wherein:
    the injection characteristic correction device corrects a parameter concerning an injection quantity of the injection of the injector as the correction concerning the injection of the injector.

10. The fuel injection controller according to claim 8, wherein:
    the injection characteristic correction device corrects an injection interval concerning the multiple injection pattern as the correction concerning the injection of the injector.

11. The fuel injection controller according to claim 8, further comprising:
    a correction coefficient holding device that holds a correction coefficient concerning the correction of the injection characteristic correction device or a value after the correction in a nonvolatile state.

12. The fuel injection controller according to claim 1, wherein:
    the execution condition of the injection execution device includes a condition that a rotational speed of the engine is within a predetermined range as one of satisfaction requirements thereof.

13. The fuel injection controller according to claim 1, wherein:

the execution condition of the injection execution device includes a condition that the engine is decelerating as one of satisfaction requirements thereof.

14. The fuel injection controller according to claim 1, wherein:
the execution condition of the injection execution device includes a condition concerning a transmission.

15. The fuel injection controller according to claim 14, wherein:
the execution condition of the injection execution device includes a condition that a clutch in a manually operational transmission is in a disengagement state as one of satisfaction requirements thereof.

16. The fuel injection controller according to claim 14, wherein:
the execution condition of the injection execution device includes a condition that lock-up of a torque converter in an automatic transmission is in a disengaged state as one of satisfaction requirements thereof.

17. The fuel injection controller according to claim 1, further comprising:
an injection execution condition varying device that variably sets the execution condition of the injection execution device.

18. The fuel injection controller according to claim 1, wherein:
the fluctuation degree obtaining device obtains a sum of the fluctuation degrees for each of the first injection unit of a certain injection pattern and the second injection unit composed of an injection pattern provided by adding or subtracting at least one injection to or from the injection pattern of the first injection unit.

19. The fuel injection controller according to claim 1, wherein:
the fluctuation degree obtaining device obtains sums of the fluctuation degrees concerning a combination of the first injection unit of a certain injection pattern and the second injection unit composed of an injection pattern different from the injection pattern of the first injection unit only in a specific parameter.

20. The fuel injection controller according to claim 1 wherein:
the fluctuation degree obtaining device provides at least one of the first and second injection units consisting of a multiple injection pattern including an injection performed at injection timing near a top dead center as a second or later stage injection.

21. The fuel injection controller according to claim 1, wherein:
the fluctuation degree obtaining device provides at least one of the first and second injection units consisting of a multiple injection pattern including an injection with an injection period equivalent to an injection invalidation period as a second or later stage injection.

22. The fuel injection controller according to claim 1, wherein:
the fluctuation degree obtaining device provides the first and second injection units respectively consisting of injection patterns, in which all the injections have short injection periods.

23. The fuel injection controller according to claim 1, wherein:
the fluctuation degree obtaining device obtains a sum of the fluctuation degrees concerning an injection pattern used for control during normal operation of the engine.

24. The fuel injection controller according to claim 1, further comprising:
a pre-obtainment correction device that performs injection correction of one of the first and second injection units before the fluctuation degree obtaining device obtains the sum of the fluctuation degrees.

25. The fuel injection controller according to claim 1, wherein:
the fluctuation degree obtaining device provides each of the first and second injection units consisting of an injection pattern of performing all the injections in the pattern during one combustion cycle.

26. The fuel injection controller according to claim 1, wherein:
the injection execution device executes at least injections of plural kinds of patterns including a single stage injection or a multiple injection in a certain order, the patterns being different from each other in the injection stage number, and
the fluctuation degree obtaining device obtains a sum of the fluctuation degrees of the engine operating condition or the equivalent thereof due to all the injections in each of the first injection unit composed of one or a combination of the plural kinds of patterns that are different from each other in the injection stage number and the second injection unit composed of different one or combination of the patterns.

27. The fuel injection controller according to claim 26, wherein:
the injection execution device executes at least an injection or injections of a first injection pattern composed of a single stage injection or a multiple injection and thereafter an injection or injections of a second injection pattern composed of a single stage injection or a multiple injection of an injection stage number different from the first injection pattern; and
the fluctuation degree obtaining device obtains a sum of the fluctuation degrees of the engine operating condition or the equivalent thereof due to all the injections in each of the first injection unit composed of the first injection pattern and the second injection unit composed of the second injection pattern, the fuel injection controller further comprising:
a conversion device that converts the sum of the fluctuation degrees of each injection unit obtained by the fluctuation degree obtaining device into a value per a certain unit injection time number.

28. The fuel injection controller according to claim 27, wherein:
one of the first and second injection patterns is composed of the single stage injection and the other one is composed of the multiple injection.

29. The fuel injection controller according to claim 28, wherein:
one of the first and second injection patterns is composed of the single stage injection and the other one is composed of the multiple injection of two stages.

30. The fuel injection controller according to claim 26, wherein:
the injection execution device executes at least a first injection pattern having n stage(s) composed of the single stage injection or the multiple injection, a second injection pattern having m stage(s) composed of the single stage injection or the multiple injection and a third injection pattern having n-plus-m stages composed of the multiple injection in a certain order; and the fluctuation degree obtaining device obtains a sum of the fluctuation degrees of the engine operating condition or the equivalent thereof due to all the injections in each of the first injection unit composed of a combination of the first injection pattern and the second injection pattern and the second injection unit composed of the third injection pattern.

31. The fuel injection controller according to claim 26, further comprising:
a reference correction device that performs injection correction of one of the first and second injection units with respect to a certain reference value before the fluctuation degree obtaining device obtains the sum of the fluctuation degrees.

32. The fuel injection controller according to claim 31, wherein:
one of the injection units corrected with respect to the reference value by the reference correction device is composed of an injection pattern of the single stage injection.

33. The fuel injection controller according to claim 31, further comprising:
an injection deviation obtaining device that compares the sums of the fluctuation degrees due to the injection units obtained by the fluctuation degree obtaining device or converted values concerning the injection units obtained by converting the sums of the fluctuation parameters into values per a certain unit injection time number between the first and second injection units to obtain a deviation degree between the values; and
a relative correction device that performs injection correction of the uncorrected injection unit by using the other injection unit, which is corrected by the reference correction device, as a reference based upon the deviation degree obtained by the injection deviation obtaining device.

34. The fuel injection controller according to claim 33, further comprising:
a continuous correction device that performs injection correction of yet another injection unit based upon the injection unit corrected by the relative correction device.

35. The fuel injection controller according to claim 1, wherein:
the injection execution device executes injections of two kinds of the multiple injection patterns different from each other at least in an injection interval in a certain order; and
the fluctuation degree obtaining device obtains a sum of the fluctuation degrees of the engine operating condition or the equivalent thereof due to all the injections in each of first and second injection units respectively composed of the two kinds of patterns different from each other in the injection interval.

36. The fuel injection controller according to claim 35, further comprising:
a memory device that stores a certain waveform concerning a change mode of the sum of the fluctuation degrees of the engine operating condition in accordance with the injection interval; and
an injection deviation obtaining device that compares sums of the fluctuation degrees due to the injection units obtained by the fluctuation degree obtaining device or converted values corresponding to the injection units obtained by converting the sums of the fluctuation parameters into values per a certain unit injection time number between the first and second injection units to obtain a deviation degree between the values, wherein
the injection deviation obtaining device combines the single first injection unit composed of a certain injection pattern with each of plural second injection units composed of plural multiple injection patterns different from each other in a size of the injection interval and obtains the deviation degree between the values for each combination, and
the injection intervals of the plural kinds of the second injection units include at least one injection interval corresponding to a portion showing regularity of the waveform stored in the memory device.

37. The fuel injection controller according to claim 36, wherein:
the portion showing the regularity includes at least one of a peak portion and a node portion of the waveform stored in the memory device.

38. The fuel injection controller according to claim 37, further comprising:
a node detection device that detects a position of a node of a waveform showing a relation between the injection interval of the second injection unit and the sum of the fluctuation degrees of the engine operating condition or the equivalent thereof due to the injection pattern of the second injection unit as a point where the deviation degree between the sums of the fluctuation degrees concerning the injection units obtained by the fluctuation degree obtaining device is zero based on the obtained sums of the fluctuation degrees concerning the injection units.

39. The fuel injection controller according to claim 38, further comprising:
a node interval obtaining device that obtains an interval between the nodes based upon the positions of the nodes detected by the node detection device; and
a cycle deviation obtaining device that obtains a cycle deviation between the waveform stored in the memory device and a waveform showing the relation between the injection interval of the second injection unit and the sum of the fluctuation degrees of the engine operating condition or the equivalent thereof due to the injection pattern of the second injection unit based upon the node interval obtained by the node interval obtaining device.

40. The fuel injection controller according to claim 37, further comprising:
a peak detection device that detects a position of a peak of the waveform showing the relation between the injection interval of the second injection unit and the sum of the fluctuation degrees of the engine operating condition or the equivalent thereof due to the second injection unit as a point where the deviation degree between the sums of the fluctuation degrees concerning the injection units obtained by the fluctuation degree obtaining device is maximized or minimized based upon the obtained sums of the fluctuation degrees concerning the injection units.

41. The fuel injection controller according to claim 40, further comprising:
a peak interval obtaining device that obtains an interval between the peaks based upon the positions of the peaks detected by the peak detection device; and
a cycle deviation obtaining device that obtains a cycle deviation between the waveform stored in the memory device and the waveform showing the relation between the injection interval of the second injection unit and the sum of the fluctuation degrees of the engine operating condition or the equivalent thereof due to the injection pattern of the second injection unit based upon the peak interval obtained by the peak interval obtaining device.

42. The fuel injection controller according to claim 35, further comprising:

a phase deviation obtaining device that obtains a phase deviation between the waveform stored in the memory device and the waveform showing the relation between the injection interval of the second injection unit and the sum of the fluctuation degrees of the engine operating condition or the equivalent thereof due to the injection pattern of the second injection unit based upon the sums of the fluctuation degrees concerning the injection units obtained by the fluctuation degree obtaining device.

43. The fuel injection controller according to claim 42, further comprising:
an injection interval correction device that corrects the injection interval based upon the phase deviation concerning the injection pattern of the second injection unit obtained by the phase deviation obtaining device.

44. The fuel injection controller according to claim 42, further comprising:
an injection start timing correction device that corrects injection start timing based upon the phase deviation concerning the injection pattern of the second injection unit obtained by the phase deviation obtaining device.

45. The fuel injection controller according to claim 42, further comprising:
an injection end timing correction device that corrects injection end timing based upon the phase deviation concerning the injection pattern of the second injection unit obtained by the phase deviation obtaining device.

46. The fuel injection controller according to claim 1, wherein:
the injection execution device executes injections of two kinds of injection patterns different from each other at least in injection timing in a certain order; and
the fluctuation degree obtaining device obtains a sum of the fluctuation degrees of the engine operating condition or the equivalent thereof due to all the injections in each of first and second injection units respectively composed of the two kinds of patterns different from each other in the injection timing.

47. The fuel injection controller according to claim 1, wherein:
the injection execution device executes injections of two kinds of injection patterns different from each other at least in an injection period in a certain order; and
the fluctuation degree obtaining device obtains a sum of the fluctuation degrees of the engine operating condition or the equivalent thereof due to all the injections in each of first and second injection units respectively composed of the two kinds of patterns different from each other in the injection period.

48. The fuel injection controller according to claim 1, wherein:
the injection execution device executes injections of two kinds of injection patterns different from each other at least in an injection rate in a certain order; and
the fluctuation degree obtaining device obtains a sum of the fluctuation degrees of the engine operating condition or the equivalent thereof due to all injections in each of first and second injection units respectively composed of the two kinds of patterns different from each other in the injection rate.

49. The fuel injection controller according to claim 1, further comprising:
a rotational speed detection device that detects a rotational speed of the engine, wherein:
the fluctuation degree obtaining device obtains a sum of the fluctuation degrees of the engine operating condition or the equivalent thereof due to all the injections based upon the engine rotational speed detected by the rotational speed detection device.

50. The fuel injection controller according to claim 49, wherein:
the fluctuation degree obtaining device converts the engine rotational speed detected by the rotational speed detection device into an energy equivalent and thereby obtains the sum of the fluctuation degrees of the engine operating condition or the equivalent thereof due to all the injections as an energy value.

51. The fuel injection controller according to claim 49, wherein:
the rotational speed detection device detects the engine rotational speed of the engine based upon a rotational speed of a crankshaft as an output shaft of the engine.

52. The fuel injection controller according to claim 49, wherein:
the rotational speed detection device detects the engine rotational speed of the engine based upon a rotational speed of a valve operating camshaft for driving an intake valve or an exhaust valve of the engine.

53. The fuel injection controller according to claim 49, wherein:
the rotational speed detection device sequentially detects the engine rotational speed in a cycle corresponding to a combustion cycle in which combustions in all cylinders of the engine are performed.

54. The fuel injection controller according to claim 49, wherein:
the rotational speed detection device sequentially detects the engine rotational speed in a cycle of a certain integral multiple of an operational cycle of an intake valve or an exhaust valve of the engine.

55. The fuel injection controller according to claim 49, further comprising:
a band pass filter having a passing band corresponding to detection timing of the engine rotational speed detected by the rotational speed detection device, wherein:
the rotational speed detection device detects the engine rotational speed of the engine through the band pass filter at timing corresponding to the passing band.

56. The fuel injection controller according to claim 49, further comprising:
a rotational speed detection timing determining device that determines whether or not the detection timing of the engine rotational speed by the rotational speed detection device is reached based upon a rotational angle of a valve operating camshaft rotating in synchronization with operation of an intake valve or an exhaust valve of the engine or a crankshaft linked with the valve operating camshaft, wherein:
the rotational speed detection device detects the engine rotational speed when the rotational speed detection timing determining device determines that the detection timing of the engine rotational speed is reached.

57. The fuel injection controller according to claim 1, further comprising:
an in-cylinder pressure detection device that detects a pressure in the cylinder, wherein:
the fluctuation degree obtaining device obtains a sum of the fluctuation degrees of the engine operating condition or the equivalent thereof due to all the injections based upon the pressure in the cylinder detected by the in-cylinder pressure detection device.

58. The fuel injection controller according to claim 1, wherein:

the engine is a multi-cylinder engine having a plurality of cylinders;

the injector is disposed in each of the plurality of the cylinders; and the injection execution device and the fluctuation degree obtaining device respectively execute the injection and the obtainment of the sum of the fluctuation degrees for each cylinder.

59. A diagnosis method of a fuel supply system of an engine for obtaining a degradation parameter showing a performance degradation degree of the fuel supply system to diagnose whether or not the fuel supply system including a injector injecting fuel to be supplied for combustion in the engine normally operates, the diagnosis method comprising:

executing injections with plural injection patterns including at least an injection pattern of a multiple injection into a certain cylinder of the engine in a certain order at least on a condition that the certain cylinder of the engine is performing non-injection operation before the injections, the injection pattern being defined only by parameters controllable with a control command to the injector;

obtaining and comparing sums of fluctuation degrees of an engine operating condition or an equivalent thereof due to all injections in a first injection unit composed of one or a combination of the plural patterns and all injections in a second injection unit composed of different one or combination of the plural patterns;

obtaining a deviation degree between the sums as the degradation parameter through the comparing; wherein the sums of the fluctuation degrees of the respective injection units are performed in the same certain cylinder; and the executing injections includes a condition that injection pressure is within a predetermined range as one of satisfaction requirements thereof.

* * * * *